US008465132B2

(12) United States Patent
Katoh et al.

(10) Patent No.: US 8,465,132 B2
(45) **Date of Patent: *Jun. 18, 2013**

(54) IMAGE FORMING APPARATUS

(75) Inventors: Tomomi Katoh, Kanagawa (JP); Toshiroh Tokuno, Tokyo (JP); Jun Ichinowatari, Kanagawa (JP); Fumitaka Kikkawa, Kanagawa (JP); Nobuyuki Akaishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 379 days.

This patent is subject to a terminal disclaimer.

(21) Appl. No.: 12/868,960

(22) Filed: Aug. 26, 2010

(65) Prior Publication Data

US 2011/0050816 A1 Mar. 3, 2011

(30) Foreign Application Priority Data

Sep. 2, 2009 (JP) ................................ 2009-203073

(51) Int. Cl.

| | |
|---|---|
| ***B41J 2/175*** | (2006.01) |
| ***B41J 2/165*** | (2006.01) |
| ***F16K 31/00*** | (2006.01) |

(52) U.S. Cl.
USPC ............................ 347/85; 347/30; 251/30.05

(58) Field of Classification Search
USPC ................. 347/84, 85, 86, 87; 251/12, 30.05
See application file for complete search history.

(56) References Cited

U.S. PATENT DOCUMENTS

| | | | | |
|---|---|---|---|---|
| 5,446,486 | A | 8/1995 | Reis | |
| 5,992,990 | A * | 11/1999 | Childers et al. | 347/87 |
| 7,325,908 | B2 | 2/2008 | Katoh et al. | |
| 7,407,241 | B2 * | 8/2008 | Mutoh et al. | 347/5 |
| 7,540,598 | B2 | 6/2009 | Hori et al. | |
| 7,547,097 | B2 * | 6/2009 | Tsukada et al. | 347/85 |
| 8,272,713 | B2 * | 9/2012 | Katoh et al. | 347/30 |
| 2007/0115333 | A1 | 5/2007 | Aruga et al. | |
| 2008/0273046 | A1 | 11/2008 | Ishinaga et al. | |
| 2009/0051724 | A1 | 2/2009 | Katoh | |
| 2009/0290002 | A1 | 11/2009 | Katoh | |

FOREIGN PATENT DOCUMENTS

| | | |
|---|---|---|
| JP | 5-504308 | 7/1993 |
| JP | 3606282 | 10/2004 |
| JP | 2004-351845 | 12/2004 |
| JP | 2005-342960 | 12/2005 |

OTHER PUBLICATIONS

U.S. Appl. No. 12/709,946, filed Feb. 22, 2010.

* cited by examiner

*Primary Examiner* — Anh T. N. Vo
(74) *Attorney, Agent, or Firm* — Cooper & Dunham LLP

(57) ABSTRACT

An image forming apparatus is disclosed that includes the pressure adjusting valve including a movable member movably disposed in the pressure adjusting valve, a first throttling part; and a second throttling part, wherein the second throttling part is formed as a gap between an internal wall of the frame of the pressure adjusting valve and the movable member, an internal fluid resistance of the pressure adjusting valve varies in response to the flow rate of the liquid, and when the liquid is discharged from the nozzle, the liquid is fed from the liquid tank to the recording head by the liquid feeding unit in a state where the recording head is in fluid communication with the liquid tank via the pressure adjusting valve.

11 Claims, 20 Drawing Sheets

IMAGE FORMING APPARATUS

CROSS-REFERENCE TO RELATED APPLICATIONS

The present application claims priority under 35 U.S.C §119 based on Japanese Patent Application No. 2009-203073 filed Sep. 2, 2009, the entire contents of which are hereby incorporated herein by reference.

BACKGROUND OF THE INVENTION

1. Field of the Invention

The present invention generally relates to an image forming apparatus, and more particularly to an image forming apparatus having a recording head discharging liquid droplets.

2. Description of the Related Art

As an image forming apparatus such as a printer, a facsimile machine, a copier, a multi function peripheral thereof and the like, there has been known an inkjet recording apparatus and the like employing a liquid discharging recording method using a recording head that discharges ink droplets. In the image forming apparatus employing the liquid discharging recording method, an image is formed by discharging ink droplets from a recording head onto a fed sheet. Herein, the term "forming" is a synonym of the terms recording typing, imaging, and printing. The image forming apparatus employing the liquid discharging recording method includes a serial-type image forming apparatus and a line-type image forming apparatus. In the serial-type image forming apparatus, an image is formed by discharging ink droplets from the recording head while the recording head moves in the main scanning direction. On the other hand, in the line-type image forming apparatus, an image is formed by discharging ink droplets from the line-type recording head while the recording head does not change its position.

Herein, the term "image forming apparatus" refers to an apparatus (including a simple liquid discharging apparatus) forming an image by discharging ink onto a medium including paper, thread, fiber, textile, leather, metal, plastic, glass, wood, ceramic and the like. Further, this term "image forming apparatus" refers to a simple liquid discharging apparatus as well. The term "image forming" refers to not only forming a meaningful image such as characters, figures, and the like on a medium but also forming a meaningless image such as a pattern and the like on a medium (including simply discharging droplets onto a medium by an apparatus such as so-called a droplet discharging apparatus or a liquid discharging apparatus). Further, the term "ink" is collectively used to refer to not only any material called "ink" but also any liquid for forming an image which may be called recording liquid, fixing processing liquid, liquid, a DNA sample, a patterning material or the like. Further, the term "sheet" is not limited to a material made of paper, and is collectively used to refer to any material called a medium to be recorded, a recording medium, recording paper, recording sheet, and the like to which ink (ink droplets) is adhered, the material including an OHP sheet, fabric and the like.

As a liquid discharging head (droplet discharging head) to be used as the recording head, there have been known a piezoelectric type head and a thermal-type head. In the piezoelectric type head, liquid droplets are discharged by increasing the pressure by changing a volume in the liquid chamber by displacing a vibration plate using a piezoelectric actuator or the like. On the other hand, in the thermal-type head, the liquid droplets are discharged by increasing the pressure in the liquid chamber by generating bubbles by heating a heating element in the liquid chamber by supplying a current to the heating element.

Regarding the image forming apparatus employing such a liquid discharging method, there has been a demand for the increase of the image forming speed. To that end, a method is widely used in which ink is supplied from the ink cartridge (main tank) to a sub tank (which may also be called a head tank or a buffer tank) via a tube, the ink cartridge (main tank) having a large capacity and being installed to be fixed to the apparatus body, the sub tank being disposed on the recording head. By using this method (tube-supply method) using the tube to supply ink, it becomes possible to reduce the size and weight of the carriage section, thereby enabling greatly reducing the size of the structure and driving mechanism of the apparatus.

In the tube-supply method, the ink to be consumed by the recording head for forming an image is supplied from the ink cartridge to the recording head via the tube. In this case, when a flexible and thin tube is used, the fluid resistance when ink flows in the tube is increased, which may cause an ink discharge failure in which necessary ink may not be sufficiently supplied to maintain the discharge stability of the ink. Especially, in a large-scale apparatus for printing a recording medium having a wide width, the length of the tube becomes longer. As a result, the fluid resistance of the tube is accordingly increased. Similarly, when fast printing is performed and when the ink having high viscosity is discharged, the fluid resistance is also increased. As a result, a failure of supplying ink to the recording head may occur.

To overcome such failure, as Japanese Patent No. 3606282 (Patent Document 1) discloses, there is a conventionally known technique in which a pressure applied to the ink in the ink cartridge is maintained, and a differential pressure valve is disposed on the ink supply upstream side of the recording head, so that the ink is supplied when the negative pressure of the sub tank is greater than a predetermined pressure.

Further, as disclosed in Japanese Patent Application Publication No. 2005-342960 (Patent Document 2), the ink supply pressure is positively controlled by using a pump to feed the ink to the negative pressure chamber where a negative pressure is generated using a spring, the negative pressure room being disposed on the upstream side of the recording head. Further, as disclosed in Japanese Patent Application Publication No. 5-504308 (Patent Document 3), a pump is similarly used to positively control the pressure without providing a negative pressure chamber.

On the other hand, to obtain the negative pressure with a simple configuration, the ink cartridge communicated with air is communicated with the recording head via a tube, and the ink cartridge is simply disposed below the recording head. By doing this, negative pressure can be obtained by the water head difference.

By using this method, more stable negative pressure can be obtained with much simpler configuration when compared with a method in which a pressure is always applied by using a negative pressure associated valve or a method in which the negative pressure chamber is disposed and the pump is used to supply liquid. However, in this method using the water head difference, the pressure loss due to the tube resistance may become a problem There is a known method of resolving the pressure loss problem in the ink supply system obtaining negative pressure using the water head difference. In this method, for example, as disclosed in Japanese Patent Application Publication No. 2004-351845 (Patent Document 4), a pump is provided in the tube between the recording head and the ink cartridge and a bypass flow path connecting the upstream side and the downstream side of the pump is provided. Further, a valve is provided in the bypass flow path, and the opening of the valve is appropriately controlled depending on the printing state, so that a desired pressure can be maintained.

However, in the method disclosed in Patent Document 1, the problem of shortage of refill supplies as described above may be resolved. However, the mechanism of controlling the negative pressure is complicated and the demand for the sealing characteristics of the negative pressure associated valve is very high. In addition, the pressure is always required to be applied. Because of this feature, the demand for the sealing characteristics of all the connecting sections in the ink supply flow path is high, and in case of trouble, ink may spout out.

In the method disclosed in Patent Documents 2 and 3, the pump is used to positively control the pressure. Therefore, it is required to accurately control the liquid feeding flow rate by using the pump in response to the consumption flow rate of ink and the like. To that end, for example, it may become necessary to perform a feedback control using the pressure of the negative pressure chamber. Further, for example, when this method is applied to an image forming apparatus using a plurality of different color ink, it is required to separately control the pump for each color ink. As a result, the control may become complicated and the size of the apparatus may be increased.

Also in the method disclosed in Patent Document 4, when this method is applied to an image forming apparatus using a plurality of different color ink, it is required to control the pumps for the respective color inks. As a result, the size of the apparatus may be increased.

SUMMARY OF THE INVENTION

The present invention is made in light of the above circumstances, and may become possible to maintain the negative pressure of the recording head in an appropriate range with a simple configuration and simple control and discharge liquid having high viscosity in high speed while reducing discharge failure.

According to an aspect of the present invention, an image forming apparatus includes a recording head having a nozzle for discharging droplets of liquid, a first fluid flow path supplying the liquid to the recording head, a liquid tank storing the liquid, a second fluid flow path being in fluid communication with the liquid tank, a pressure adjusting valve allowing the first fluid flow path and the second fluid flow path to be in fluid communication with each other, and a third fluid flow path having a liquid feeding unit, the third fluid flow path allowing either the second fluid flow path or the liquid tank and the pressure adjusting valve to be in fluid communication with each other. Further, the pressure adjusting valve include a tube member defining an internal fluid flow path of the pressure adjusting valve, a movable member movably disposed in the internal fluid flow path, a first throttling part disposed on a side of the first fluid flow path, and a second throttling part disposed on a side of the second fluid flow path. Further, the second throttling part is formed as a gap between an internal wall of the tube member and the movable member; a length of the gap varies in response to a flow rate of the liquid flowing in the first fluid flow path; an internal fluid resistance of the pressure adjusting valve varies in response to the flow rate of the liquid flowing in the first fluid flow path; the third fluid flow path is in fluid communication with the internal fluid flow path through a part of the pressure adjusting valve, the part being disposed between the first throttling part and the second throttling part; and, when the liquid is discharged from the nozzle, the liquid is fed from the liquid tank to the recording head by the liquid feeding unit in a state where the recording head is in fluid communication with the liquid tank via the pressure adjusting valve.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In the following, embodiments of the present inventions are described with reference to the accompanying drawings.

Figure 1:
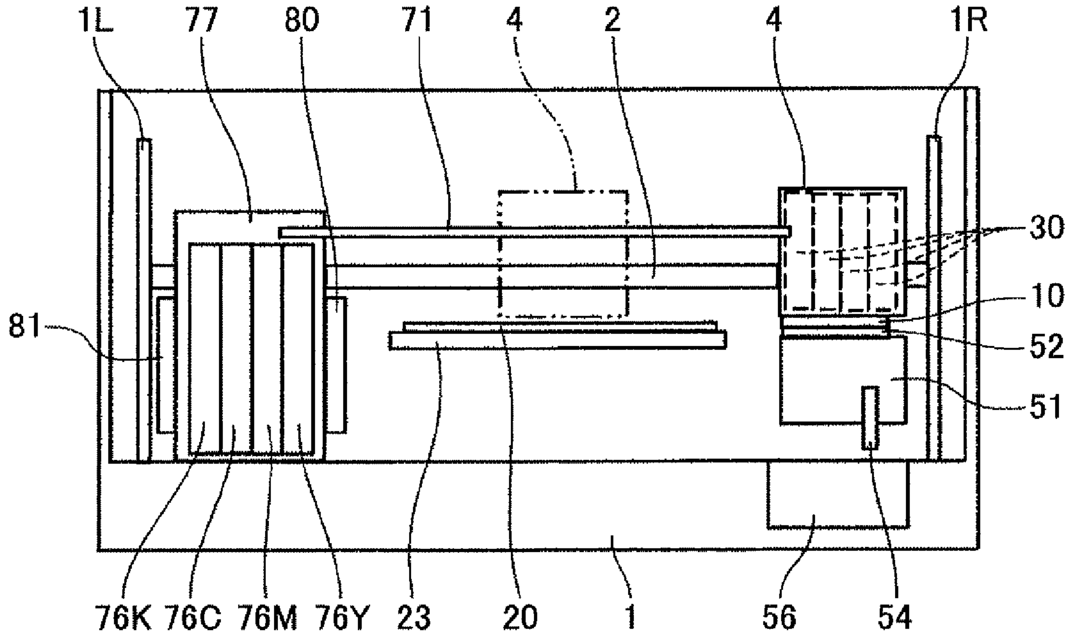
FIG. 1 is a schematic front view illustrating an inkjet recording apparatus as an image forming apparatus according to an embodiment of the present invention.
Figure 2:
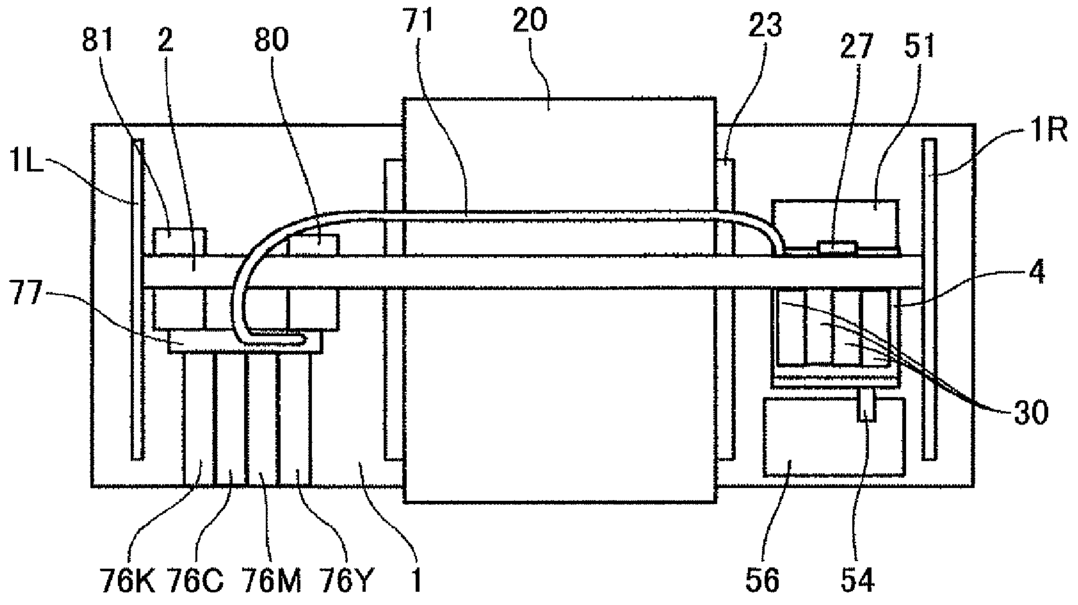
FIG. 2 is a schematic top view illustrating the inkjet recording apparatus.
Figure 3:
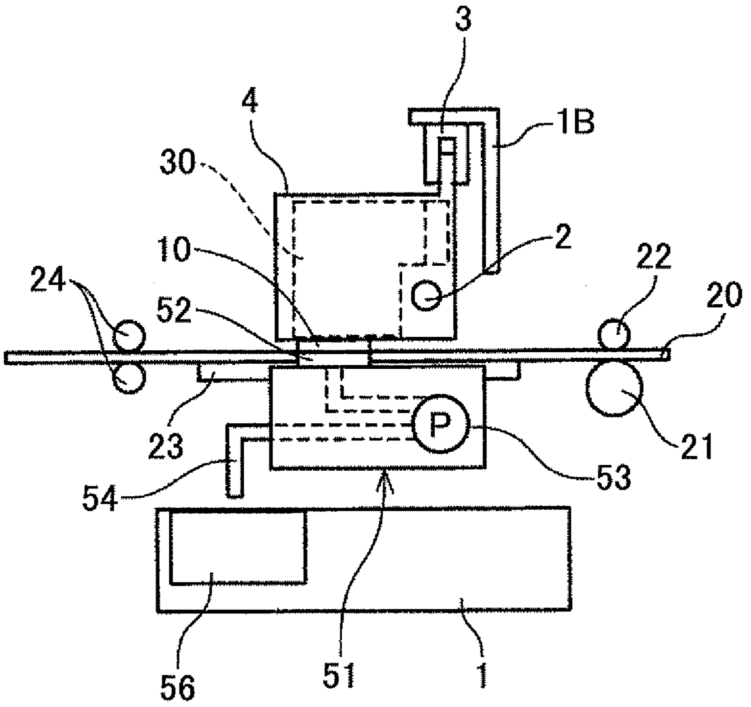
FIG. 3 is a schematic side view illustrating the inkjet recording apparatus.

First, an inkjet recording apparatus as an image forming apparatus according to an embodiment of the present invention is described with reference to FIGS. 1 through 3. FIGS. 1 through 3 are a schematic front view, a schematic top view, and a schematic side view, respectively, of the inkjet recording apparatus.

As illustrated in FIGS. 1 through 3, in the inkjet recording apparatus, a carriage 4 is slidably supported by a guide rod 2 and a guide rail 3 in the main scanning direction (guide rod longitudinal direction), so that the carriage 4 moves in the longitudinal direction (main scanning direction) of the guide rod 2 by using a motor and a timing belt (both not shown). The guide rod 2 is a guide member bridged between two side plates 1L and 1R which are installed in a standing manner on the left and right sides, respectively, of a main body frame 1. The guide rail 3 is attached to a rear frame 1B after the rear frame B is bridged between the main body frame 1.

On the carriage 4, one or more recording heads 10 are mounted discharging, for example, black (K), cyan (C), magenta (M), and yellow (Y) ink droplets. The recording heads 10 have plural ink discharging ports (nozzles) arranged in the direction crossing the main scanning direction so that ink discharging direction is in the downward direction.

Figure 4:
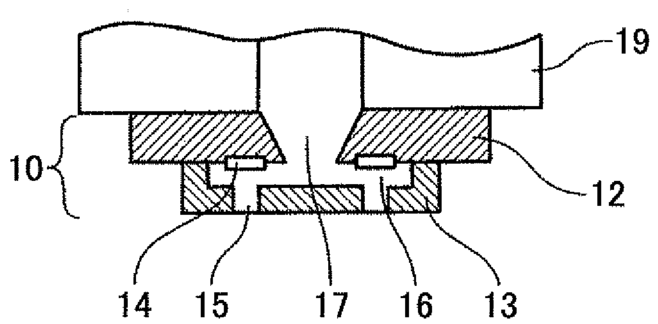
FIG. 4 is an enlarged cross-sectional view illustrating a recording head of the inkjet recording apparatus.

Herein, as illustrated in FIG. 4, the recording heads 10 includes a heating body substrate 12 and a liquid-chamber defining member 13, so that ink is discharged as liquid droplets, the ink being supplied from an ink supply path defined by a base member 19 to a liquid chamber (separate flow path) 16 via a common flow path 17. The recording heads 10 employ a thermal type method in which a pressure for discharging ink is generated by film boiling of ink driven by a heating body 14. Further, the recording heads 10 employ a side shooter method in which an ink flowing direction towards a discharge energy operating section (heating body section) in the liquid chamber (separate flow path) 16 is orthogonal to the direction of the center axis of the opening of the nozzle 15.

There are various types of the recording heads. For example, in one method employed by the recording head, the pressure for discharging ink is obtained by deforming a vibration plate using a piezoelectric device or electrostatic force. The recording head employing any other method may also be used in the image forming apparatus according to an embodiment of the present invention.

However, some recording heads using the thermal method employ an edge shooter method in which the relationship between the ink flowing direction and the center axis direction is different from that in the side shooter method. When this edge shooter method is used, the heating body 14 may be gradually destroyed due to the impact generated during bubble collapse. This phenomenon is called a cavitation phenomenon. On the contrary, the side shooter method has the following advantages when compared with the edge shooter method due to the structural difference. In the side shooter method, when bubbles expand and reach the nozzle 15, the bubbles reach air also. Therefore, the bubbles are not shrunk due to the temperature decrease. As a result, the lifetime of the recording head may become longer. Further, the energy from the heating body 14 can be effectively converted into kinetic energy used for forming and discharging ink droplets. Further, the meniscus can be recovered faster due to ink supply. Because of the advantages, the recording head of the inkjet recording apparatus according to an embodiment of the present invention employs the side shooter method.

On the other hand, under the carriage 4, a sheet 20 on which an image is to be formed by the recording head 10 is fed in the direction (sub scanning direction) orthogonal to the main scanning direction. As illustrated in FIG. 3, the sheet 20 is sandwiched between a feeding roller 21 and a pressing roller 22 and fed to an image forming region (printing section) on an image guide member 23. Then, the sheet 20 is further fed in the discharge direction by a sheet discharging roller pair 24.

During that period, the scanning of the carriage 4 in the main scanning direction and the ink discharge from the recording head 10 is synchronized with each other at appropriate timings based on an image data to be printed. By doing this, one band of image is formed on the sheet 20. After one band of the image forming is completed, the sheet 20 is fed in the sub scanning direction by a predetermined distance. Then the same image forming operation is repeated until the entire page of the image forming operation is completed.

On the other hand, a sub tank (buffer tank, head tank) 30 and the recording head 10 are integrally connected to each other so that the sub tank 30 is disposed on the recording head 10. Herein, the state expressed by the term "integrally (connected)" includes a state that the recording head 10 and the sub tank 30 are connected with a tube and the like, and both of the recording head 10 and the sub tank 30 are mounted on the carriage 4.

Each color ink is supplied from an ink cartridge (main tank) 76 to the sub tank 30 via a liquid supply tube 71. The ink cartridge (main tank) 76 is a liquid tank of the present invention containing each color ink and is removably attached to a cartridge holder 77 disposed on one end in the main scanning direction of the apparatus main body. The liquid supply tube 71 is a tube member forming a part of the ink supply path from the ink cartridge (main tank) 76 and forming (serving as) a first flow path.

On the other end in the main scanning direction of the apparatus main body, a maintenance-and-recovery mechanism 51 is disposed that maintains and recovers the recording head 10. As illustrated in FIG. 3, the maintenance-and-recovery mechanism 51 includes a cap member 52, a suction pump 53, and a discharge path tube 54. The cap member 52 caps a nozzle surface of the recording head 10. The suction pump 53 suctions inside the cap member 52. The ink suctioned from inside the cap member 52 is discharged as waste liquid through the discharge path tube 54 to a waste liquid tank 56 disposed on a side of the main body frame 1.

Figure 5:
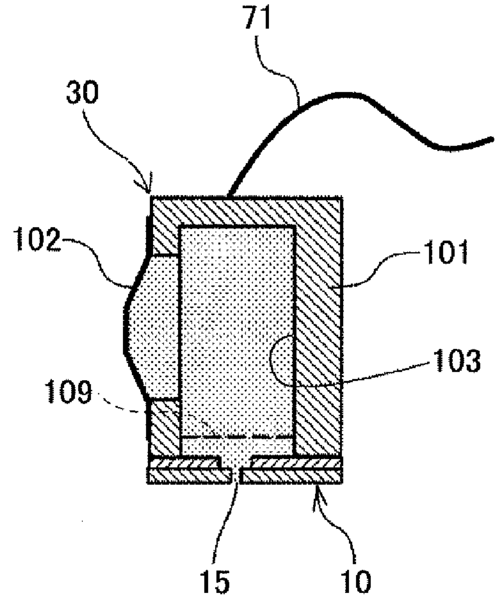
FIG. 5 is a schematic cross-sectional view illustrating a sub tank of an ink supply system of the inkjet recording apparatus.
Figure 6:
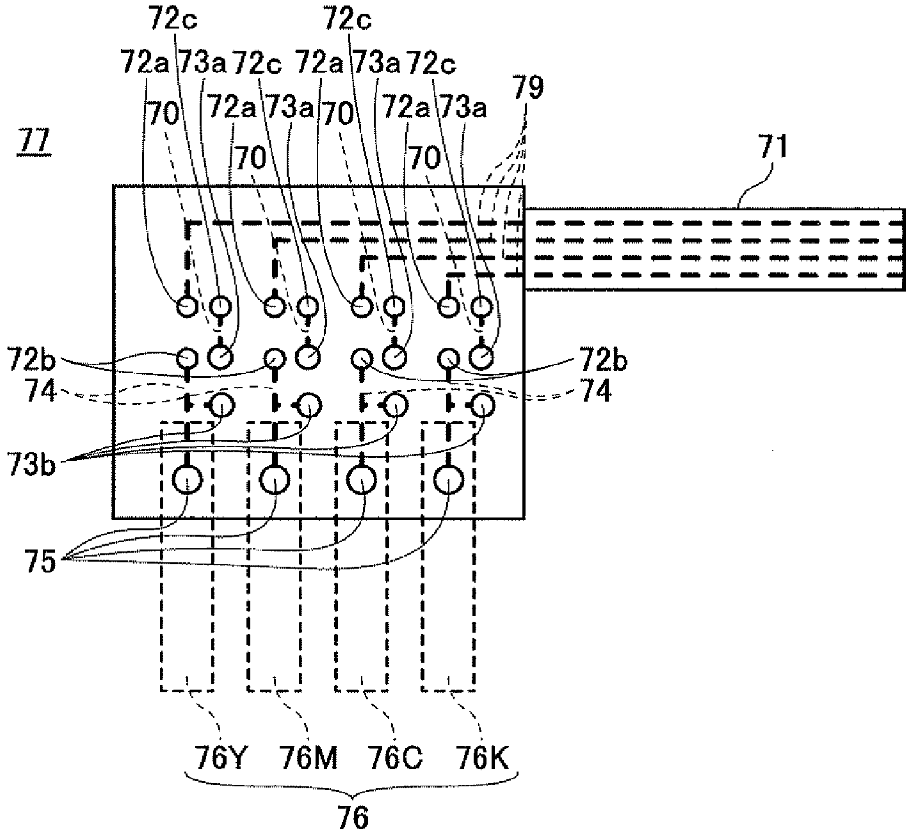
FIG. 6 is a view illustrating a part of a cartridge holder of the inkjet recording apparatus.
Figure 7:
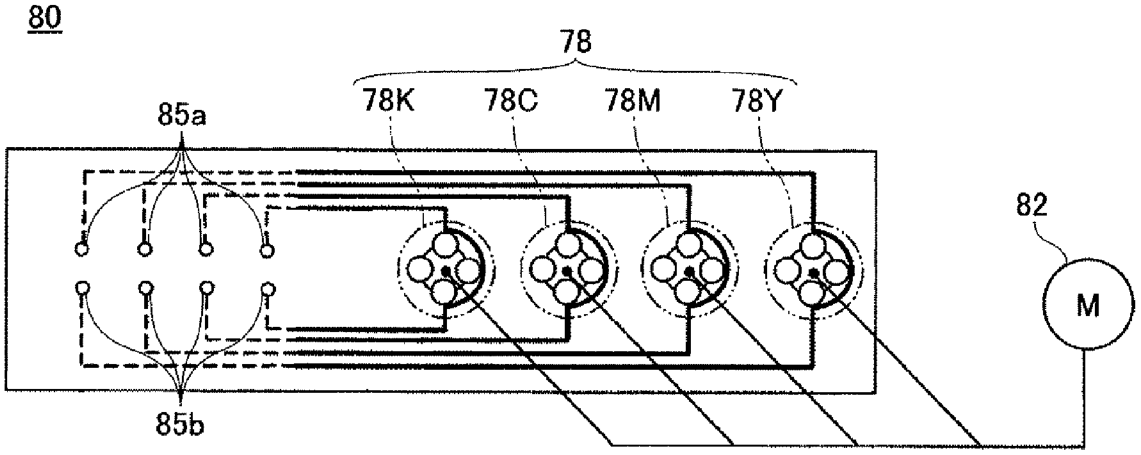
FIG. 7 is a schematic view illustrating a pump unit of the inkjet recording apparatus.
Figure 8:
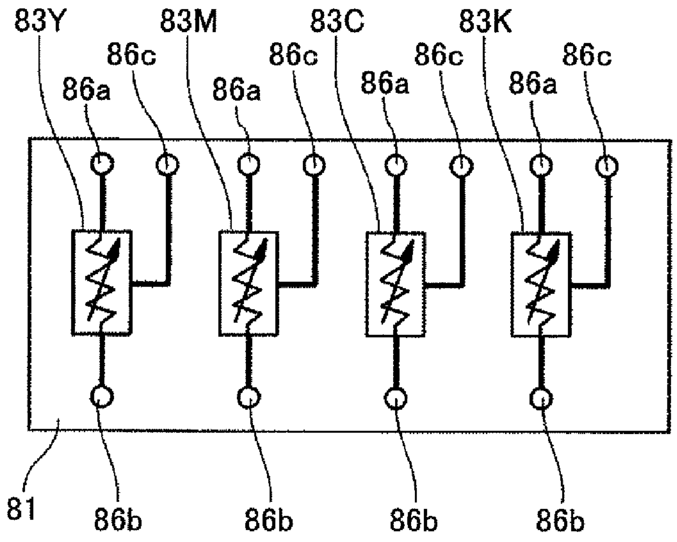
FIG. 8 is a schematic view illustrating a pressure control unit of the inkjet recording apparatus.
Figure 9:
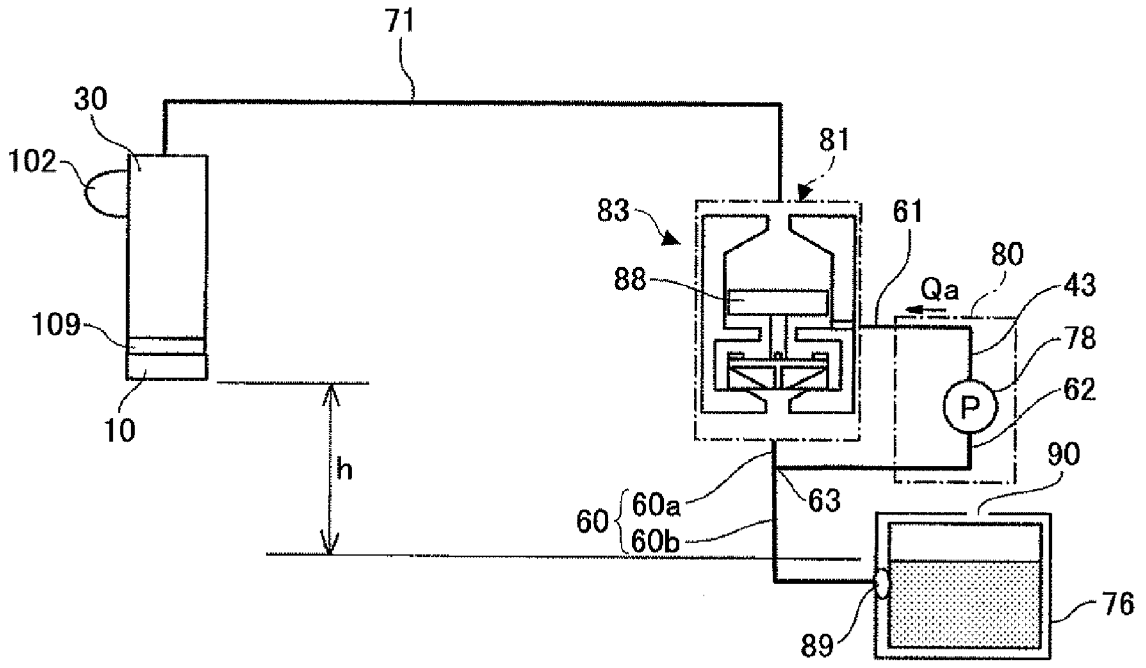
FIG. 9 is a schematic view illustrating a configuration of the ink supply system according to a first embodiment of the present invention.
Figure 10B:
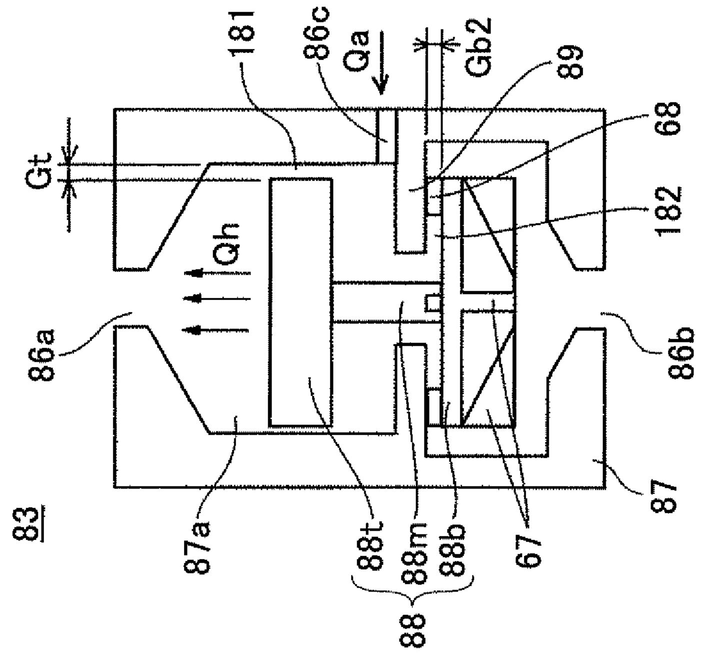
FIGS. 10A and 10B are schematic cross-sectional views illustrating an example of a flow path resistance varying unit used in the ink supply system according to the first embodiment of the present invention.
Figure 10A:
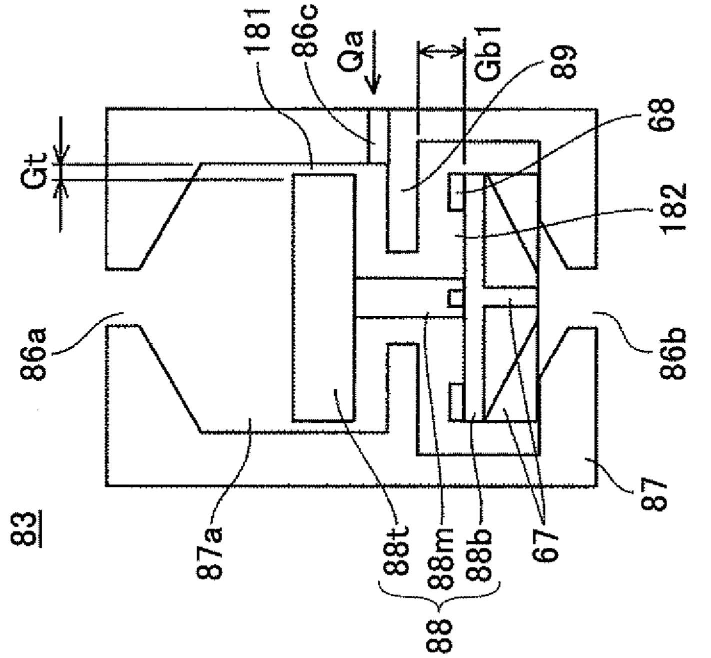

Next, an ink supply system according to an embodiment of the present invention that can be used in the above inkjet recording apparatus is described with reference to FIGS. 5 through 10. FIG. 5 is a schematic cross-sectional view illustrating a sub tank of an ink supply system of the inkjet recording apparatus. FIG. 6 is a view illustrating a part of a cartridge holder of the inkjet recording apparatus. FIG. 7 is a schematic view illustrating a pump unit of the inkjet recording apparatus. FIG. 8 is a schematic view illustrating a pressure control unit of the inkjet recording apparatus. FIG. 9 is a schematic view illustrating a configuration of the ink supply system according to a first embodiment of the present invention. FIGS. 10A and 10B are schematic cross-sectional views illustrating an example of a flow path resistance varying unit used in the ink supply system according to the first embodiment of the present invention.

FIG. 5 illustrates a configuration of the sub tank 30. As illustrated in FIG. 5, the sub tank 30 includes a tank case 101 defining an ink chamber 103 and having an opening. The opening is sealed with a flexible rubber member 102 formed in a manner such that the rubber member 102 has a convex part protruding outwardly from the opening. Further, a filter 109 is disposed in the ink chamber 103 and near a connecting part between the sub tank 30 and the recording head 10, so that the filter 109 filters the ink to remove impurities and the like from the ink and the filtered ink is supplied to the recording head 10.

Further, one end of the liquid (ink) supply tube 71 is connected to the sub tank 30. The other end of the liquid (ink) supply tube 71 is connected to the cartridge holder 77 mounted to the apparatus main body as illustrated in FIGS. 1 and 2.

Further, as illustrated in FIGS. 1 and 2, the cartridge holder 77 is connected with the ink cartridge (main tank) 76, a pump unit 80 serving as a fluid feeding means, and a pressure control unit 81.

FIG. 6 illustrates a configuration of the cartridge holder 77. As illustrated in FIG. 6, in the cartridge holder 77, internal flow paths 70, 74, and 79 are formed. There are pump connection ports 73*a* and 73*b* communicating with the pump unit 80, and there are pressure control ports 72*a*, 72*b*, and 72*c* communicating with the pressure control unit 81. The pump connection ports 73*a* and the pressure control ports 72*c* are communicating with each other via the internal flow path 70.

FIG. 7 illustrates a configuration of the pump unit 80. As illustrated in FIG. 7, in the pump unit 80, there are ports 85*a* and 85*b* to be in communication with the pump connection ports 73*a* and 73*b*, respectively. Further, there is a pump (assist pump) 78 serving as a fluid feeding means communicating between the ports 85*a* and 85*b*. As the pump (assist pump) 78, any of various pumps such as a tubing pump, a diaphragm pump, and a gear pump may be used. In the pump unit 80 of FIG. 7, four pumps 78K, 78C, 78M, and 78Y are provided for four color inks. Further, those four pumps are collectively driven by one motor 82.

FIG. 8 illustrates a configuration of the pressure control unit 81. As illustrated in FIG. 8, the pressure control unit 81 includes ports 86*a*, 86*b*, and 86*c* and a flow path resistance varying unit 83. The ports 86*a*, 86*b*, and 86*c* are in communication with the pressure control ports 72*a*, 72*b*, and 72*c*, respectively, of the cartridge holder 77. The flow path resistance varying unit 83 serves as a pressure adjusting valve and is in communication with the ports 86*a*, 86*b*, and 86*c*.

Next, an exemplary configuration and operations of the ink supply system according to the first embodiment of the present invention is described with reference to FIG. 9. FIG. 9 illustrates a schematic configuration of the ink supply system according to the first embodiment of the present invention. For simplification and explanatory purposes, only main elements connected to one liquid discharging head (i.e., recording head) 10 are illustrated.

As illustrated in FIG. 9, the ink supply system includes the ink cartridge (main tank) 76, the liquid (ink) supply tube 71, a second flow path 60, the pressure control unit 81, the pump unit 80, and a third flow path 61 and 62. The ink cartridge (main tank) 76 stores ink to be supplied to the recording head 10. The liquid (ink) supply tube 71 is disposed between the pressure control unit 81 and the recording head 10 and used to supply ink to the recording head 10. Herein, the liquid (ink) supply tube 71 may also be called a “first flow path (71)”. The second flow path 60 is disposed between the ink cartridge (main tank) 76 and the pressure control unit 81 and is used to supply ink from the ink cartridge (main tank) 76 (the second flow path 60 is in communication with the ink cartridge (main tank) 76). The second flow path 60 has a branch section 63 in the middle of the second flow path 60. The pressure control unit 81 is disposed between the first flow path 71 and the second flow path 60 so that the first flow path 71 is in communication with the second flow path 60 via the pressure control unit 81. Further, in the following, a flow path between the pressure control unit 81 and the branch section 63 may be called a flow path 60*a*, and a flow path between the ink cartridge (main tank) 76 and the branch section 63 may be called a flow path 60*b* as illustrated in FIG. 9. Herein, the pressure control unit 81 serves as the pressure adjusting valve. The pump unit 80 includes the pump (assist pump) 78 which serves as the fluid feeding means for feeding ink to the pressure adjusting valve (flow path resistance varying unit 83). The third flow path 61 and 62 (or collectively 43) includes the flow path 61 disposed between the pressure adjusting valve (flow path resistance varying unit 83) and the pump (assist pump) 78 and the flow path 62 disposed between the pump (assist pump) 78 and the branch section 63.

Herein, the flow path resistance varying unit 83 has characteristics in which the flow path resistance of the flow path resistance varying unit 83 varies depending on the flowing direction and the flow rate of the fluid flowing in the flow path resistance varying unit 83. FIGS. 10A and 10B illustrate a configuration of the flow path resistance varying unit 83. As illustrated in FIGS. 10A and 10B, the flow path resistance varying unit 83 includes a tube member 87 and a valve body 88. The tube member 87 serves as a flow path forming member defining an internal flow path 87*a* of the pressure adjusting valve (flow path resistance varying unit 83). The valve body 88 is a movable member that is movably accommodated in an unbound state in the tube member 87.

As illustrated in FIGS. 10A and 10B, the tube member 87 has ports 86*a*, 86*b*, and 86*c*. The port 86*a* is connected to the first flow path (liquid (ink) supply tube) 71. The port 86*b* is connected to the flow path 60*a* of the second flow path 60. The port 86*c* is connected to the third flow path 61. The valve body 88 is an axis-shaped member having, for example, step members having different radii from each other with respect to a liquid flow direction. For example, the valve body 88 includes at least three step members (step elements), which are a valve body top part 88*t*, a valve body middle part 88*m*, and a valve body bottom part 88*b*. The tube member 87 has a separation wall 89 protruding inward from the tube member 87. The separation wall 89 is integrally formed with the tube member 87. When the valve body 88 is disposed in the tube member 87, the separation wall 89 is disposed between the valve body top part 88*t* and the valve body bottom part 88*b*.

As described above, the valve body 88 is movably disposed in the tube member 87. Depending on the state of the fluid flowing in the tube member 87, the valve body 88 changes its position in the tube member 87 to the position (lower dead point) indicated in FIG. 10A, the position (upper dead point) indicated in FIG. 10B, or to any position between the lower dead point and the upper dead point. The valve body bottom part 88*b* includes ribs 67 formed on the bottom side of the valve body bottom part 88*b*. The valve body bottom part 88*b* further includes protrusions 68 formed on the upper surface of the valve body bottom part 88*b*. By having the ribs 67 and protrusions 68, even when the valve body 88 is at the lower dead point and the upper dead point, respectively, the ports 86*a* and 86*b* are communicated with each other via the internal flow path 87*a*.

By disposing the valve body 88 in the tube member 87, in the internal flow path 87*a*, a first gap is formed between an outer circumference surface of the valve body top part 88*t* and an inner wall surface of the tube member 87. Hereinafter, a part having the first gap may be called a first throttling part 181. Further, in the internal flow path 87*a*, a second gap is formed between an upper surface (side) of the valve body bottom part 88*b* and a lower surface (side) of the separation wall 89. Hereinafter, a part having the second gap may be called a second throttling part 182. As described above, depending on the state of the fluid flowing in the tube member 87, the valve body 88 changes its position in the tube member 87. For example, depending on the flow rate of the fluid flowing in the first flow path (liquid (ink) supply tube) 71, the valve body 88 changes its position in the tube member 87. Then, when the valve body 88 changes its position in the tube member 87, the second throttling part (second gap) 182 varies accordingly. Namely, in this case, a throttle value (indicating the degree of throttle) of the second throttling part (second gap) 182 also varies accordingly.

Further, the tube member 87 includes a transverse hole (port) 86*c* formed from a part of the inner wall surface of the tube member 87, the part facing the valve body middle part 88*m*. Namely, the transverse hole (port) 86*c* is disposed between the first throttling part 181 and the second throttling part 182. Further, the transverse hole (port) 86*c* is connected to the third flow path 61 to serve as a part of the third flow path.

Referring back to FIG. 9, the ink cartridge (main tank) 76 includes an air communication section 90 allowing the outside and inside of the ink cartridge (main tank) 76 to communicate with each other. Further, a liquid surface in the ink cartridge (main tank) 76 is disposed at a lower position than the nozzle surface of the recording head 10. By having this configuration, when the entire ink supply path is filled with ink, the recording head 10 is maintained at a negative pressure due to a water head difference "h" between the liquid surfaces of the recording head 10 and that in the ink cartridge (main tank) 76. The negative pressure enables the recording head 10 to stably discharge ink droplets.

Figure 11:
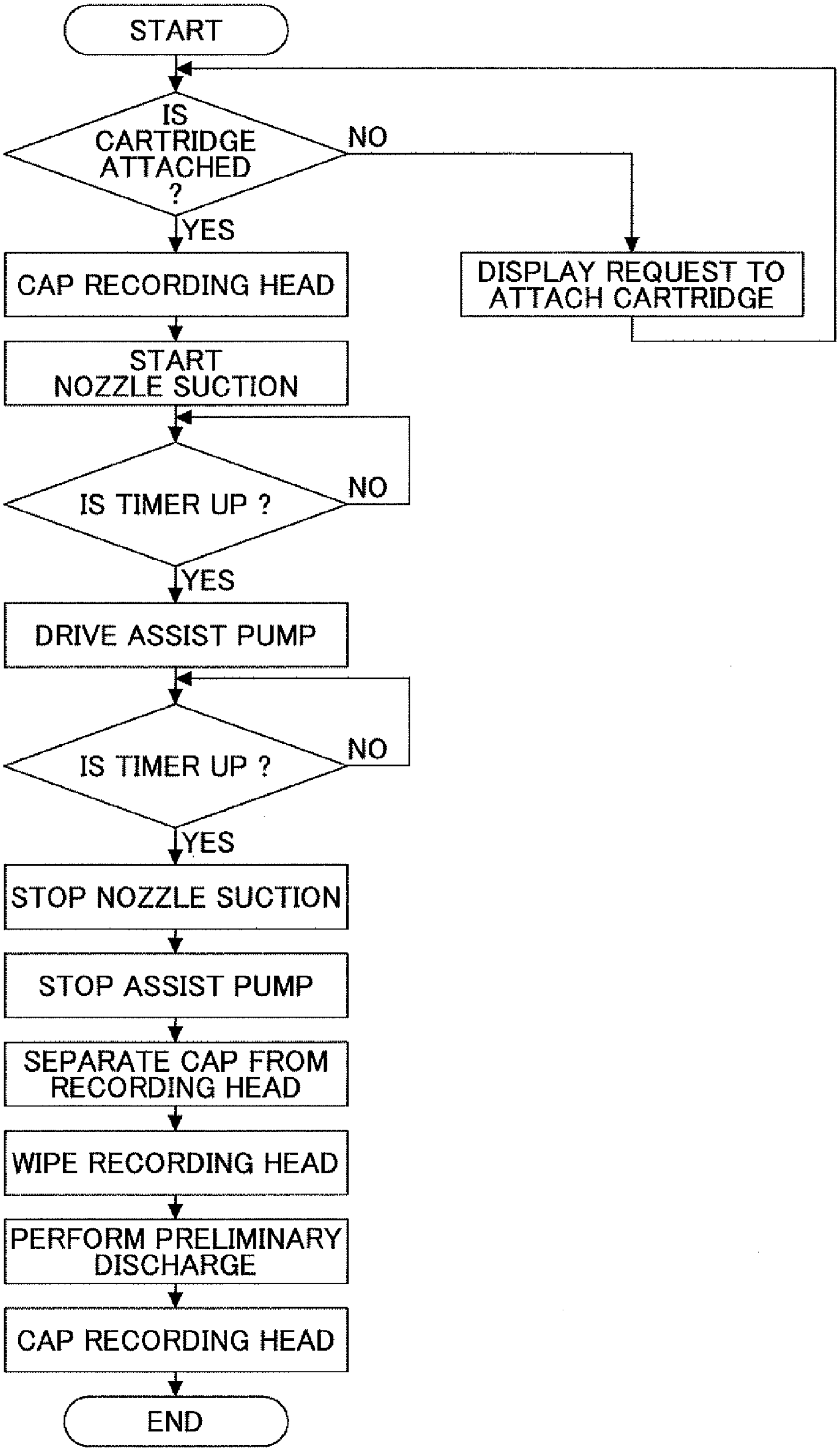
FIG. 11 is a flowchart illustrating an initial ink filling operation according to the first embodiment of the present invention.

Next, an initial ink filling operation using the above ink supply path is described with reference to the flowchart of FIG. 11.

After determining that the ink cartridge (main tank) 76 is attached, the nozzle surface of the recording head 10 is capped with the cap member 52 of the maintenance-and-recovery mechanism 51 (capping condition). During the capping condition, the suction pump 53 is driven to suction air inside the ink supply path through the nozzle of the recording head 10 (start nozzle suction). This nozzle suction is continued until a predetermined time period has elapsed since the start of the nozzle suction. By performing the nozzle suction for the predetermined time period, ink in the ink cartridge (main tank) 76 reaches the first flow path (liquid (ink) supply tube) 71.

After that, when determining that a predetermined time period has elapsed since the start of the nozzle suction (when timer is up), the motor 82 is driven to drive the pump (assist pump) 78. At this timing, the ink supply path is formed as illustrated in FIG. 9. Therefore, by driving the pump (assist pump) 78, ink is fed in the Qa arrow direction towards the flow path resistance varying unit 83. By doing this, air in the third flow path 61 and 62 is fed to the flow path resistance varying unit 83 and is replaced by ink.

After that, when determining that a predetermined time period has elapsed (when timer is up), both the suction pump 53 and the pump (assist pump) 78 are stopped. At this timing, the entire ink supply path is filled with ink.

After that, the cap member 52 of the maintenance-and-recovery mechanism 51 is released (separated) from the nozzle surface of the recording head 10 (capping condition is released), and the nozzle surface of the recording head 10 is wiped by a wiper member (not shown) of the maintenance-and-recovery mechanism 51. Then, the recording head 10 is driven to discharge a predetermined number of droplets which do not contribute to forming any meaningful image from the nozzle (preliminary discharge of recording head). By doing this, a desired meniscus is formed on the nozzle surface.

Then, the nozzle surface of the recording head 10 is capped with the cap member 52 of the maintenance-and-recovery mechanism 51 (head capping).

By doing in this way, the initial ink filling operation is finished. According to the flowchart of FIG. 11, the pump (assist pump) 78 is continuously driven until the nozzle suction is stopped. However alternatively, the initial ink filling operation may be performed by stopping the pump (assist pump) 78 when the replacement of air in the third flow path 61 and 62 and the transverse hole (port) 86*c* by ink is completed. Further, in the example of FIG. 11, the pump (assist pump) 78 is driven while the first flow path (liquid (ink) supply tube) 71 and the recording head 10 are being filled with ink. Therefore, the initial ink filling operation may be completed in a shorter time period.

Figure 12:
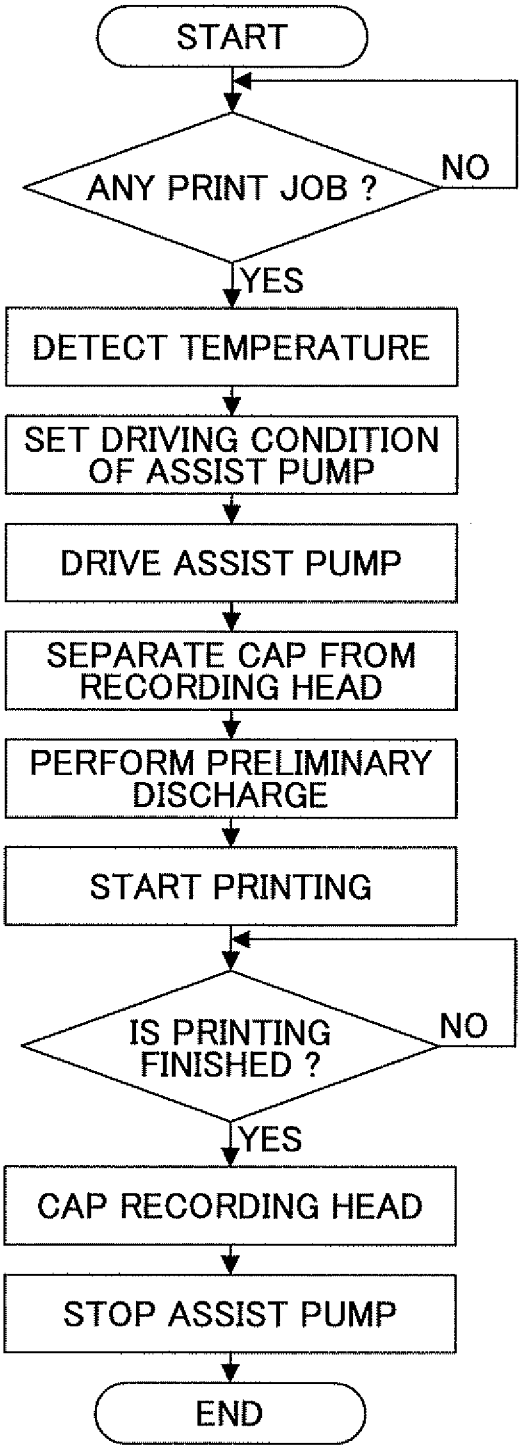
FIG. 12 is a flowchart illustrating a printing operation according to the first embodiment of the present invention.

Next, a printing operation is described with reference to the flowchart of FIG. 12.

After a print job signal is received, a temperature in the apparatus is detected by a temperature sensor 27 (FIG. 2) so that the ink temperature is estimated. In the example of FIG. 2, the temperature sensor 27 is mounted in the carriage 4. However alternatively, the temperature sensor 27 may be disposed at another position such as on the ink cartridge (main tank) 76 or on the recording head 10. Otherwise, the temperature sensor 27 may be disposed in the ink supply path so as to directly detect the ink temperature.

Then, based on the detected (estimated) ink temperature, a flow rate to be fed by the pump (assist pump) 78 is determined, so that the pump (assist pump) 78 is driven to feed the determined flow rate. After that, the cap member 52 of the maintenance-and-recovery mechanism 51 is released (separated) from the nozzle surface of the recording head 10 (capping condition is released). Then, the recording head 10 is driven to discharge a predetermined number of droplets from the nozzle (preliminary discharge of recording head). After that, printing is started.

During that time, the pump (assist pump) 78 is being driven. Therefore, even when ink having high viscosity is used in a system having a long liquid (ink) supply tube (first flow path) 71, it may become possible to adequately reduce the pressure loss in ink supply paths. As a result, it may become possible to perform good printing while preventing the ink supply shortage.

After the printing operation is finished, the carriage 4 is returned to its predetermined position (home position) in the apparatus. Then, the nozzle surface of the recording head 10 is capped with the cap member 52 of the maintenance-and-recovery mechanism 51 (head capping). Then, the pump (assist pump) 78 is stopped.

Herein alternatively, the pump (assist pump) 78 may be stopped immediately after the printing operation is finished. Further, in the above description, the flow rate to be fed by the pump (assist pump) 78 is controlled based on the temperature. However alternatively, regardless of the temperature, depending on the requirement of ink supply or the like, the ink may be fed based on the flow rate that is determined as the flow rate that may not cause the ink supply shortage at the lowest possible temperature.

In such a printing operation, in a case where the viscosity of ink to be discharged is high or where the fluid resistance of the liquid (ink) supply tube (first flow path) 71 is high, when, for example, the tube is thin or long, or an flow rate of discharged ink is large, the ink supply shortage may occur due to the fluid resistance of the ink supply paths. More specifically, major parts responsible for impeding the ink supply in the ink supply system are the liquid (ink) supply tube (first flow path) 71, the filter 109, and a joint section 89 (FIG. 9).

For example, in a case where an image forming apparatus having a wide width has the diameter and the length of the liquid (ink) supply tube (first flow path) 71 of 2.8 mm and 2,500 mm, respectively, when ink having high viscosity of 16 cP is discharged, the fluid resistance of the liquid (ink) supply tube (first flow path) 71 becomes 2.7e10 [Pa·s/$m^3$]. Further, in this embodiment, it is assumed that the fluid resistances of the filter 109 and the joint section 89 are 1e10 [Pa·s/$m^3$] and 2e9 [Pa·s/$m^3$], respectively.

In this case, it is assumed that the limit value of the pressure loss so as to stably discharge ink from the recording head 10 is 2.5 kPa. When ink is continuously discharged from all the nozzles, the flow rate of discharged ink is 0.1 cc/s. Then, the pressure loss is 6.9 kPa. Further, when there is no pressure control unit 81, the pressure loss is 3.94 kPa. Therefore, an ink supply system simply utilizing the water head difference may not naturally supply ink.

As described above, when the pressure loss is increased due to the fluid resistances in the ink supply system and refilling shortage occurs, the pump (assist pump) 78 is then driven to feed ink from the third flow path 43 (61 and 62) in the Qa direction. Herein, a symbol "Qa" denotes an assist flow rate or a fluid (ink) flow for assist. However, for explanatory purposes, the symbol "Qa" is also used as a sign of an arrow. By feeding fluid (ink) by the pump (assist pump) 78, the ink supply shortage may be compensated (refill assist).

Figure 13:
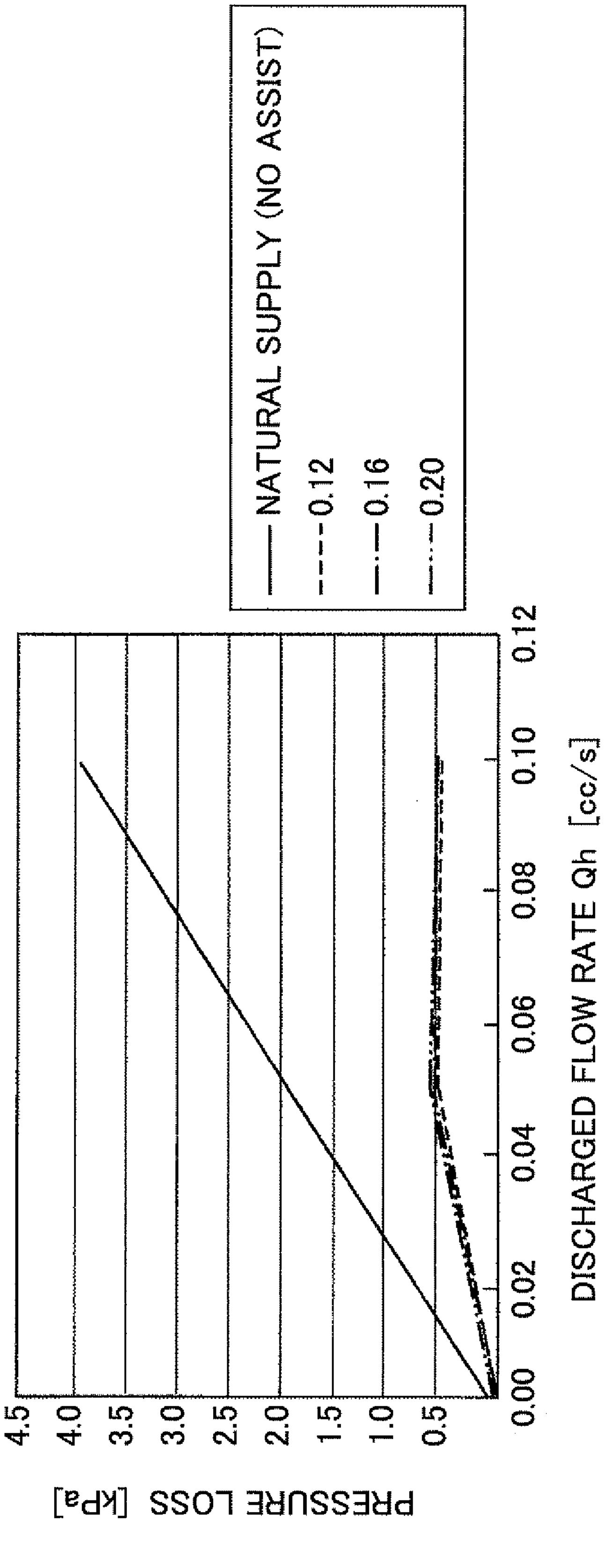
FIG. 13 is a graph illustrating a relationship between a recording head discharge flow rate and a recording head pressure loss according to the first embodiment of the present invention.

FIG. 13 is a graph illustrating an example of a relationship between a discharged flow rate of the recording head 10 and the pressure loss in the ink supply system when a supply flow rate (assist flow rate) of the pump (assist pump) 78 varies. More specifically, FIG. 13 illustrates the change of the pressure loss in the ink supply system in response to the discharged flow rate of the recording head 10 when the supply flow rate (assist flow rate) of the pump (assist pump) 78 varies from 0 to 0.2 cc/s. As described above, when ink is supplied without any assistance (in natural supply), the pressure loss at the recording head 10 may reach up to approximately 3.9 kPa. As a result, ink may not be continuously (stably) discharged, and namely, ink discharge failure may occur. However, when the pump (assist pump) 78 is used to assist the ink feeding, the pressure loss is reduced to at most approximately 0.5 kPa or less, which enables the recording head 10 to continuously (stably) discharge ink droplets.

Next, how to assist the ink feeding in the ink supply system is described with reference to FIGS. 10A and 10B.

FIG. 10A illustrates a state of the flow path resistance varying unit 83 when ink droplets are not discharged from the recording head 10 or when the discharged flow rate is small. In this state, the valve body 88 is disposed on the side of the port 86*b*.

First, in the state of FIG. 10A, the second gap "Gb" formed between an upper surface (side) of the valve body bottom part 88*b* and a lower surface (side) of the separation wall 89 (in this case, the gap "Gb" is called "Gb1") is greater (wider) than the first gap "Gt" formed between the outer circumference surface of the valve body top part 88*t* and the inner wall surface of the tube member 87. Namely, the throttle value of the second throttling part 182 is smaller than that of the first throttling part 181. Further, on the downstream side of the ports 86*a*, as illustrated in FIG. 9, there are the liquid (ink) supply tube (first flow path) 71 and the filter 109 having larger fluid resistances in the ink supply system. Therefore, ink fed by the pump (assist pump) 78 in the Qa arrow direction is more likely to flow to the port 86*b* in the flow path resistance varying unit 83. As a result, most of the ink pumped (fed) by the pump (assist pump) 78 may circulate in a loop between the pump unit 80 and the flow path resistance varying unit 83, which does not influence the pressure to the recording head 10.

On the other hand, FIG. 10B illustrates a state of the flow path resistance varying unit 83 when the discharged flow rate from the recording head 10 is large. By setting the first gap "Gt" relatively narrow, due to the ink flow in the Qh direction caused by the ink discharge from the recording head 10, the valve body 88 is pulled up to the side of the port 86*a* from the position illustrated in FIG. 10A (namely the valve body 88 is moved upward). Due to this upward movement, the valve body bottom part 88*b* approaches the separation wall 89, so that the second gap "Gb" between the valve body bottom part 88*b* and the separation wall 89 (in this case, the gap "Gb" is called "Gb2") becomes narrower (i.e., Gb2<Gb1). Further, the ink fed by the pump (assist pump) 78 in the Qa arrow direction is flown through the narrower second gap "Gb2", which generates a pressure. This generated pressure reduces (cancels) the pressure loss generated when the ink flows in the ink supply system. As a result, a larger flow rate of ink may be supplied to the recording head 10.

According to this embodiment of the present invention, the larger the pressure loss becomes in response to the increase of the discharged flow rate from the recording head 10, the narrower the second gap "Gb" between the valve body bottom part 88*b* and the separation wall 89 becomes. In other words, in this case, the throttle value of the second throttling part 182 becomes accordingly larger. Further, in this case, the effect of the assist pressure generated by the pump (assist pump) 78 is accordingly increased. Therefore, it may become possible to realize the automatic ink supply having a simple configuration without performing conventional complicated control of the flow rate adjustment valve using an actuator.

In the configuration according to this embodiment of the present invention, the fluid resistance at the second throttling part 182 having the second gap "Gb" varies inversely with the fourth power of the second gap "Gb" between the valve body bottom part 88*b* and the separation wall 89. Because of this feature, in this ink supply system in which the second gap varies directly depending on the movement of the valve body 88, it may become possible to obtain good responsiveness when generating the assist pressure to reduce the pressure loss in the ink supply system.

Further, in this ink supply system, there are protrusions 68 partially formed on the upper surface (side) of the valve body bottom part 88*b*. Because of the protrusions 68, even when the valve body 88 is in contact with the separation wall 89 due to inertia of the movement or the like, a flow path corresponding to the height of the protrusions 68 is secured. Namely, it becomes possible to prevent the case where the second gap "Gb" becomes zero (0), the ink flow path is fully blocked, and the negative pressure at the recording head 10 is suddenly increased. Alternatively, the protrusions 68 may be disposed on the lower surface (side) of the separation wall 89 facing the upper surface (side) of the valve body bottom part 88*b*. Even if the protrusions 68 are disposed in this way, the same effect may be obtained.

Figure 14B:
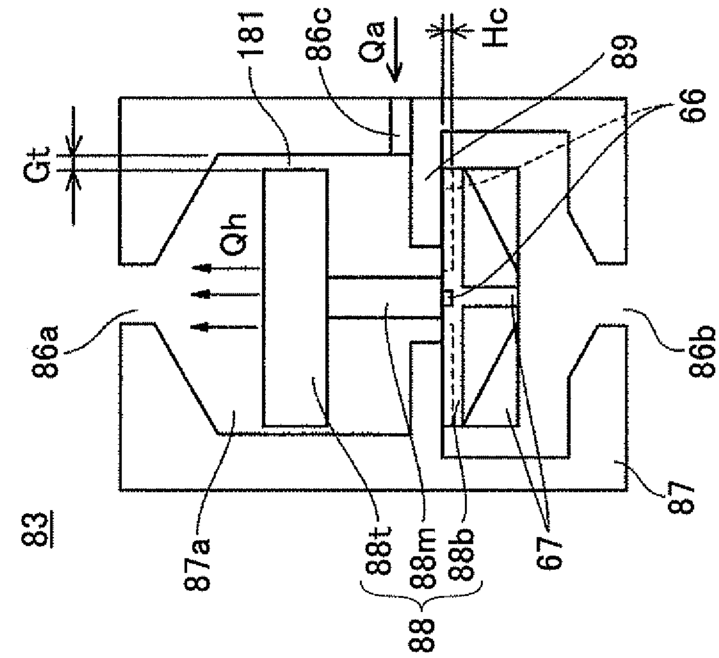
FIGS. 14A and 14B are schematic cross-sectional views illustrating another example of the flow path resistance varying unit used in the ink supply system according to the first embodiment of the present invention.
Figure 14A:
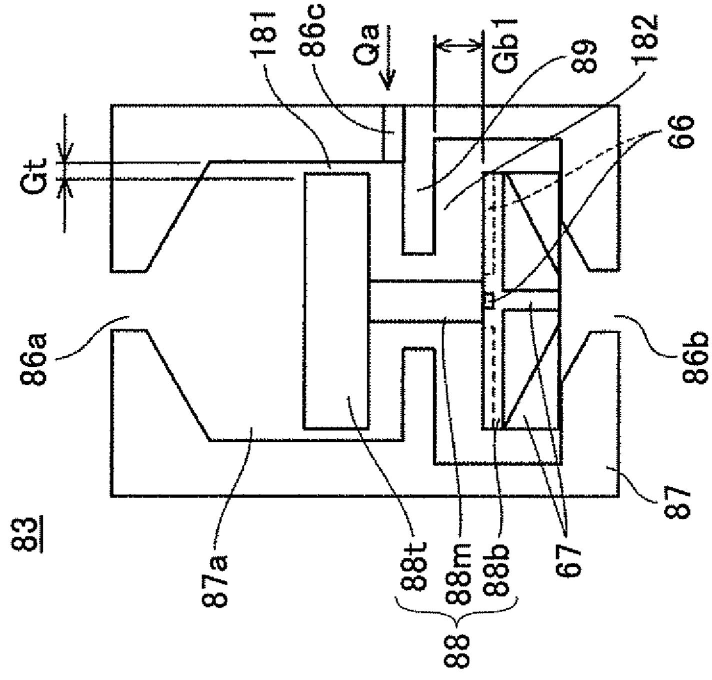

Further alternatively, as illustrated in FIGS. 14A and 14B, grooves 66 may be formed on the upper surface (side) of the valve body bottom part 88*b*. By forming the grooves 66 in this way, even when the valve body 88 reaches the position of the upper dead point and the valve body bottom part 88*b* is in contact with the separation wall 89, the ink flow path having the height "Hc" due to the grooves 66 is ensured. As a result, it becomes possible to prevent the ink supply path (fluid supply path) from being fully blocked. The same effect may be obtained when the grooves (66) are formed on the lower surface (side) of the separation wall 89 facing the upper surface (side) of the valve body bottom part 88*b*.

Further, as described above, the image forming apparatus according to this embodiment of the present invention may discharge four color inks for color printing. To that end, there are provided four separate ink supply systems each having the configuration as illustrated in FIG. 9. In this case, four separate actuators such as motors corresponding to four pumps (assist pumps) 78 may be provided, so that the actuators can be independently controlled to respond to the ink discharge flow rate of the respective recording heads 10. However alternatively, as illustrated in FIG. 7, only one motor (actuator) 82 may be used for the four pumps (assist pumps) 78 (i.e., pumps (assist pumps) 78K, 78C, 78M, and 78Y) corresponding to the number of color inks.

When an image is formed by discharging plural colors, the flow rates of color inks discharged from the recording heads 10 may vary depending on an image to be formed. For example, there may be a case where ink is discharged from all nozzles of a certain recording head but no ink is discharged from any nozzle of another recording head. Even in this case, in the ink supply system according to this embodiment of the present invention, the fluid resistances of the flow path resistance varying units 83 automatically vary in response to the flow rate of the color inks discharged from the respective recording heads 10. Because of this feature, it is not necessary to control the pumps (assist pumps) 78 in response to the flow rate of ink discharged from the respective recording heads 10. Namely, as control of the ink supply system according to this embodiment of the present invention, less assist (pressure) is automatically provided (generated) for the recording head requiring less assist (pressure) due to small flow rate of ink discharged from the recording head. On the other hand, greater assist (pressure) is also automatically provided (generated) for the recording head 10 requiring greater assist (pressure) due to large flow rate of ink discharged.

As described above, according to this embodiment of the present invention, even in a system having plural ink supply systems due to, for example, the use of plural color inks for color printing, it may be possible to collectively control all the pumps of the respective ink supply systems with only one actuator. Because of this feature, the configuration of the apparatus and the control method may be simplified, and the cost and the size of the apparatus may be accordingly reduced.

Generally, the viscosity of fluid varies depending on the fluid temperature. Therefore, it is preferable to control the pump (assist pump) 78 to determine the flow rate of fluid (ink) fed (assisted) by the pump (assist pump) 78 based on feedback control using a temperature value such as an ambient temperature value or an inside temperature value of the apparatus measured using the temperature sensor 27 in FIG. 2, an ink (liquid) temperature value, and an estimated temperature value thereof. By doing this, it may become possible to provide an apparatus that can be easily operated in response to all possible temperatures.

Further, a pressure sensor may be installed in the ink supply path, so that the pressure change is measured when a predetermined flow rate of ink is discharged from the recording head 10. Based on the measurement result, the viscosity of the fluid (ink) corresponding to the pressure loss due to the fluid (ink) may be detected. Then, based on the detected viscosity value, a parameter for controlling the pump (assist pump) 78 may be changed, thereby enabling using various liquids having different viscosities. Further, the parameter for controlling the pump (assist pump) 78 may be input by a user while the user monitors the discharge condition. In this case, the mechanism of detecting the fluid viscosity may be omitted, thereby simplifying the configuration of the apparatus.

Figure 15:
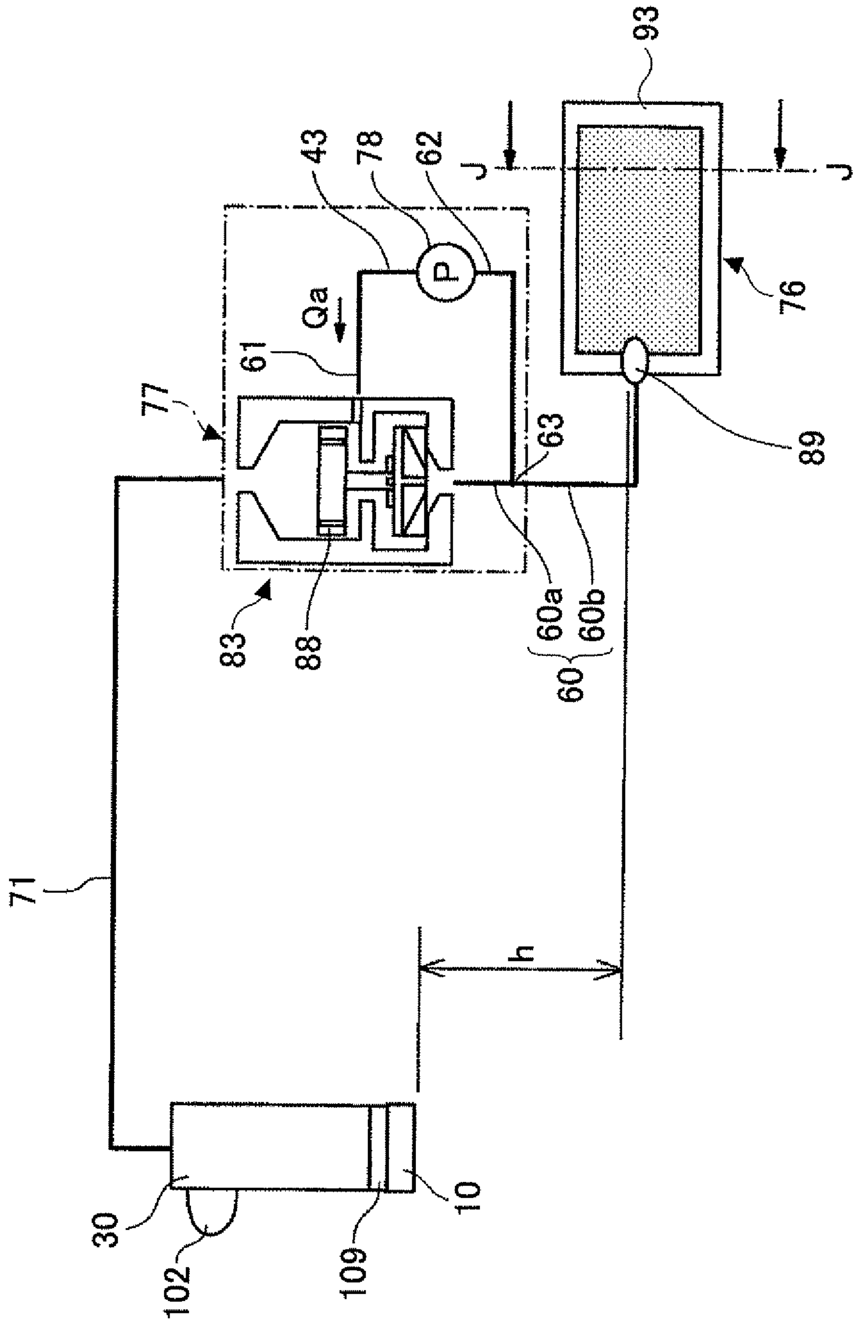
FIG. 15 is a schematic view illustrating a configuration of the ink supply system according to a second embodiment of the present invention.
Figure 16A:
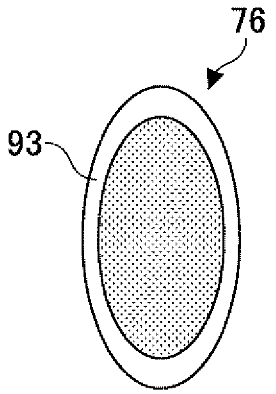
FIGS. 16A and 16B are cross-sectional views cut along a line J-J in FIG. 15.
Figure 16B:
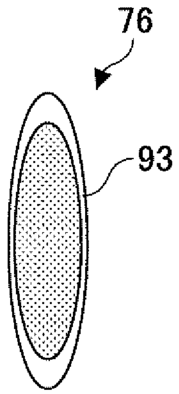
Figure 17A:
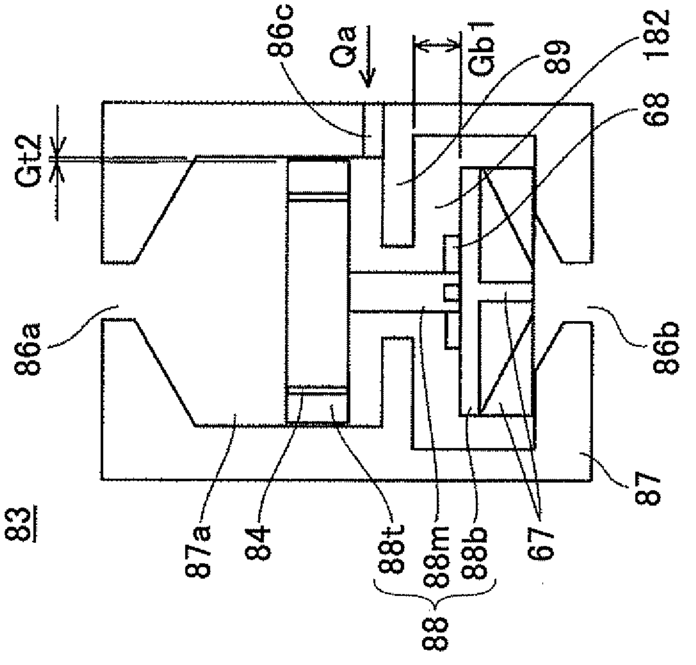
FIGS. 17A and 17B are schematic cross-sectional views illustrating an example of the flow path resistance varying unit used in the ink supply system according to the second embodiment of the present invention.
Figure 17B:
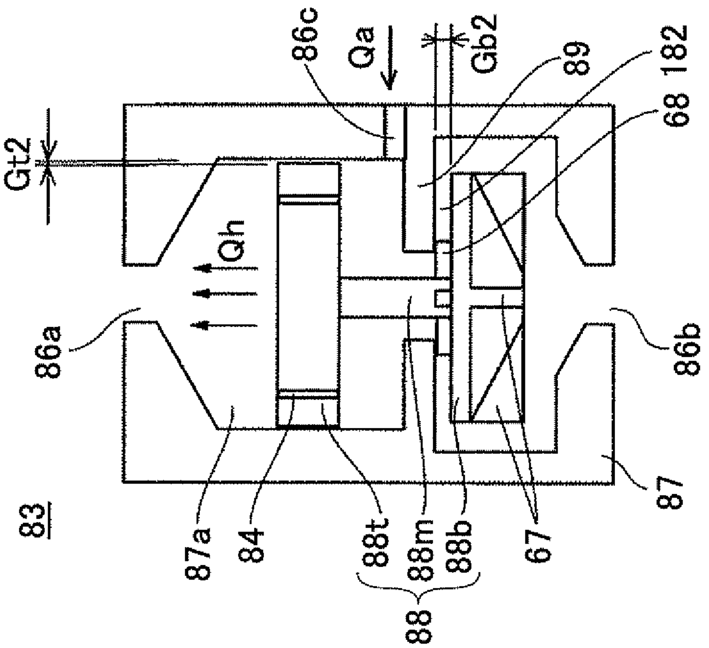
Figure 18:
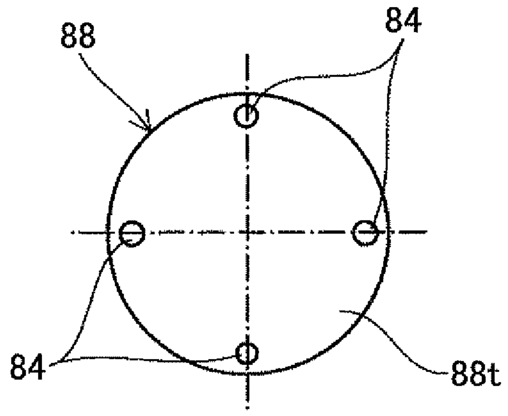
FIG. 18 is a top view of a valve body of the flow path resistance varying unit used in the ink supply system according to the second embodiment of the present invention.

Next, an ink supply system according to a second embodiment of the present invention is described with reference to FIGS. 15 through 18. FIG. 15 schematically illustrates a configuration of the ink supply system. FIGS. 16A and 16B are cross-sectional views cut along a line J-J in FIG. 15. FIGS. 17A and 17B are schematic cross-sectional views illustrating an example of a flow path resistance varying unit used in the ink supply system. FIG. 18 is a top view of a valve body of the flow path resistance varying unit used in the ink supply system.

First, the ink cartridge (main tank) 76 includes a bag member 93 made of a flexible material that can be flexibly deformed when ink is consumed. In this case, for example, the shape of the bag member 93 is changed from the state of FIG. 10A to the state of FIG. 10B. In the bag member 93 of the ink cartridge (main tank) 76, liquid (ink) is contained. The position of the liquid (ink) is lower than that of the nozzle surface of the recording head 10.

By having the configuration of the ink cartridge (main tank) 76, the ink supply system becomes a sealed system. Therefore, it may become easier to stably maintain the quality of the fluid (ink) to be supplied to the recording head 10. Further, the negative pressure at the recording head 10 is maintained by the height difference between the recording head 10 and the ink cartridge (main tank) 76. Because of this feature, a stable negative pressure may be obtained.

Further, as schematically illustrated in FIGS. 17A and 17B, the valve body top part 88*t* of the flow path resistance varying unit 83 has a larger diameter than that in the first embodiment (e.g. FIGS. 10A and 10B) of the present invention. As a result, the first gap "Gt2" between the valve body top part 88*t* and the tube member 87 becomes narrower than that ("Gt" in FIGS. 10A and 10B) in the first embodiment of the present invention (i.e., Gt2<Gt). Further, there are through holes 84 extending in the direction parallel to the axis (longitudinal) direction of the valve body 88 and formed between the upper surface and the lower surface of the valve body top part 88*t*. The through holes 84 serve as the first throttling part. Further, as illustrated in FIG. 18, four through holes 84 are symmetrically disposed with respect to the circumferential direction (rotational direction) of the valve body 88 when viewed from the top. Further, as illustrated in FIGS. 17A and 17B, protrusions 68 are formed on the upper surface (side) of the valve body bottom part 88*b* in a manner such that the protrusions 68 are formed on the periphery surface of the valve body middle part 88*m*.

In this ink supply system, when the valve body 88 changes its position (up and down direction) in the flow path resistance varying unit 83, the throttle value of the second throttling part 182 between the valve body bottom part 88*b* and the separation wall 89 of the tube member 87 accordingly changes. When the throttle value of the second throttling part 182 changes, the fluid resistance of the flow path resistance varying unit 83 accordingly changes. By changing the fluid resistance of the flow path resistance varying unit 83, the pressure value (assist pressure) to cancel the negative pressure value is adjusted. In this case, a force moving the valve body 88 is generated (determined) due to the throttle of the through holes 84 which is serving as the first throttling part. By forming the first throttling part by using the through holes 84 of the valve body top part 88*t*, it may become easier to accurately form the first throttling part. As result, it may become possible to obtain stable throttle characteristics.

Further, as described above, four through holes 84 are symmetrically disposed with respect to the circumferential direction (rotational direction) of the valve body 88. However alternatively, the diameter of the through holes 84 may become smaller and the number of the through holes 84 may be increased. Otherwise, the diameter of the through holes 84 may become larger and the number of the through holes 84 may be decreased. However, it is preferable that the through holes 84 be symmetrically disposed with respect to the circumferential direction (rotational direction) of the valve body 88 so that the valve body 88 can be moved straightly along the axis direction.

Similar to the above first embodiment of the present invention, in this second embodiment, when the valve body 88 moves, the second gap between the valve body bottom part 88*b* and the separation wall 89 of the tube member 87 accordingly changed in a range between "Gb1" (FIG. 17A) and "Gb2" (FIG. 17B). Because of this feature, when the flow rate of liquid (ink) discharged from the recording head 10 is increased, the pressure loss of the liquid (ink) supply system is accordingly increased and the valve body 88 moves upward. This upward movement of the valve body 88 leads to reduce the second gap between the valve body bottom part 88*b* and the separation wall 89. This narrower second gap generates more positive pressure caused by the flow rate "Qa" supplied into the flow path resistance varying unit 83 (pressure adjusting valve) by the pump (assist pump) 78. As a result, this generated positive pressure cancels (reduces) the pressure loss at the recording head 10, so that liquid (ink) may be appropriately refilled to the recording head 10.

Further, similar to the above first embodiment of the present invention, in the configuration according to this second embodiment, the fluid resistance at the second throttling part 182 having the second gap varies inversely with the fourth power of the second gap between the valve body bottom part 88*b* and the separation wall 89. Because of this feature, in this ink supply system in which the second gap varies directly depending on the movement of the valve body 88, it may become possible to obtain good responsiveness when generating the assist pressure to reduce the pressure loss in the ink supply system.

Further, in this ink supply system, there are protrusions 68 partially formed on the upper surface (side) of the valve body bottom part 88*b*. Because of the protrusions 68, even when the valve body 88 is in contact with the separation wall 89 due to inertia of the movement or the like, a flow path corresponding to the height of the protrusions 68 is ensured. Namely, it becomes possible to prevent the case where the second gap "Gb" becomes zero (0), the ink flow path is fully blocked, and the negative pressure at the recording head 10 is suddenly increased.

Further, the protrusions 68 are integrally formed with the valve body middle part 88*m* (smaller radius part). Because of this feature, it may become easier to perform mold design when the valve body 88 is formed by molding. Further, it may become possible to enhance the bending stiffness of the valve body middle part 88*m* and strength of the valve body 88.

Further, in this second embodiment of the present invention, as illustrated in FIG. 15, the pump (assist pump) 78 and the flow path resistance varying unit 83 are integrally provided in the cartridge holder 77. Because of this feature, it may become possible to reduce the size of the apparatus and reduce the number of sealing members used for connecting parts, thereby reducing the cost of the apparatus.

Figure 19:
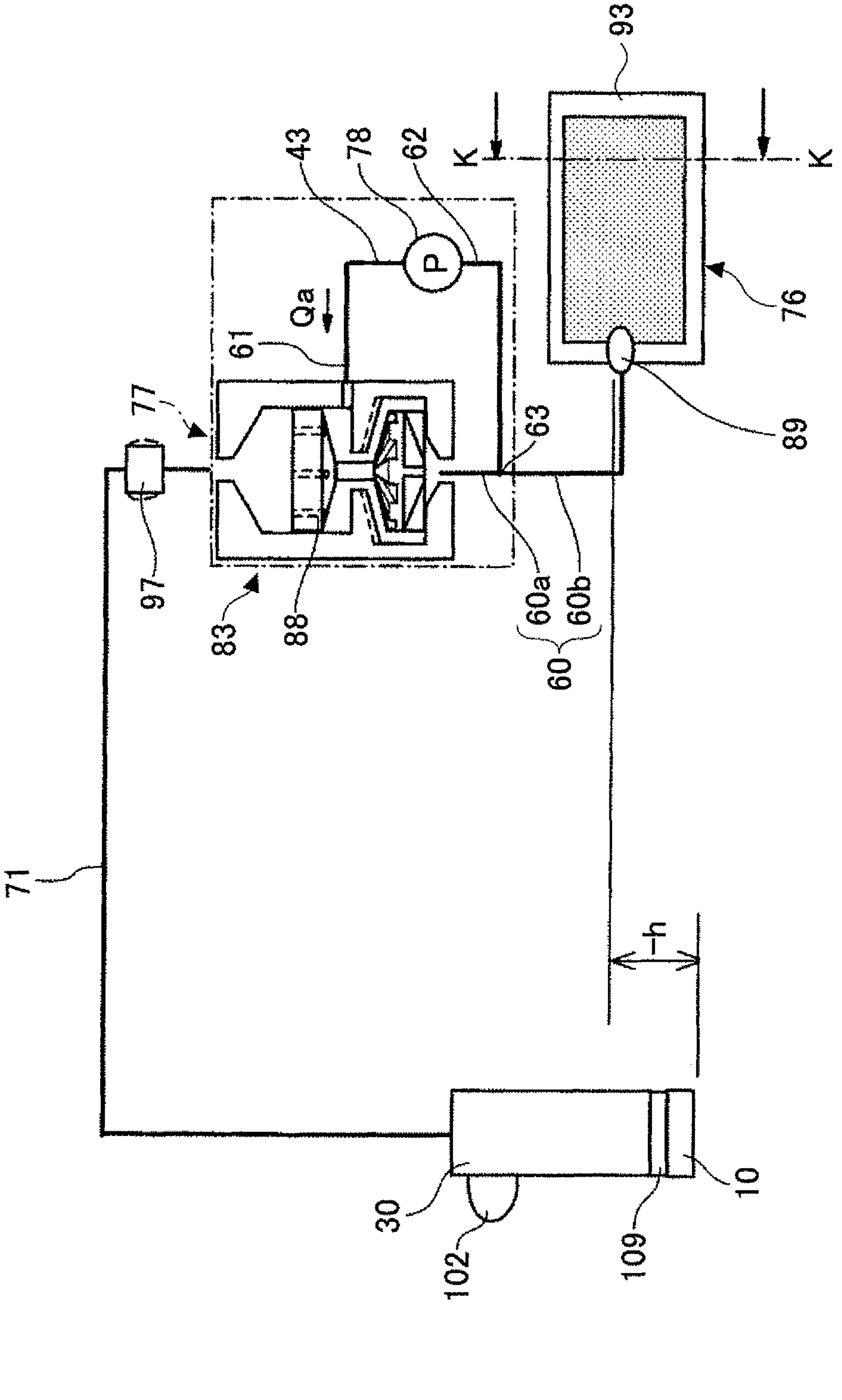
FIG. 19 is a schematic view illustrating a configuration of the ink supply system according to a third embodiment of the present invention.
Figure 20A:
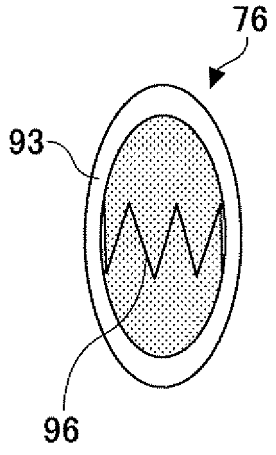
FIGS. 20A and 20B are cross-sectional views cut along a line K-K in FIG. 19.
Figure 20B:
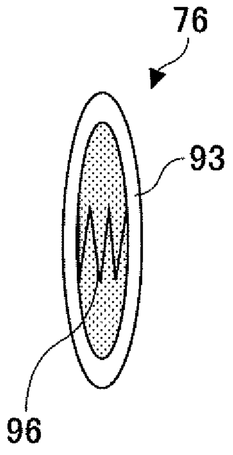
Figure 21:
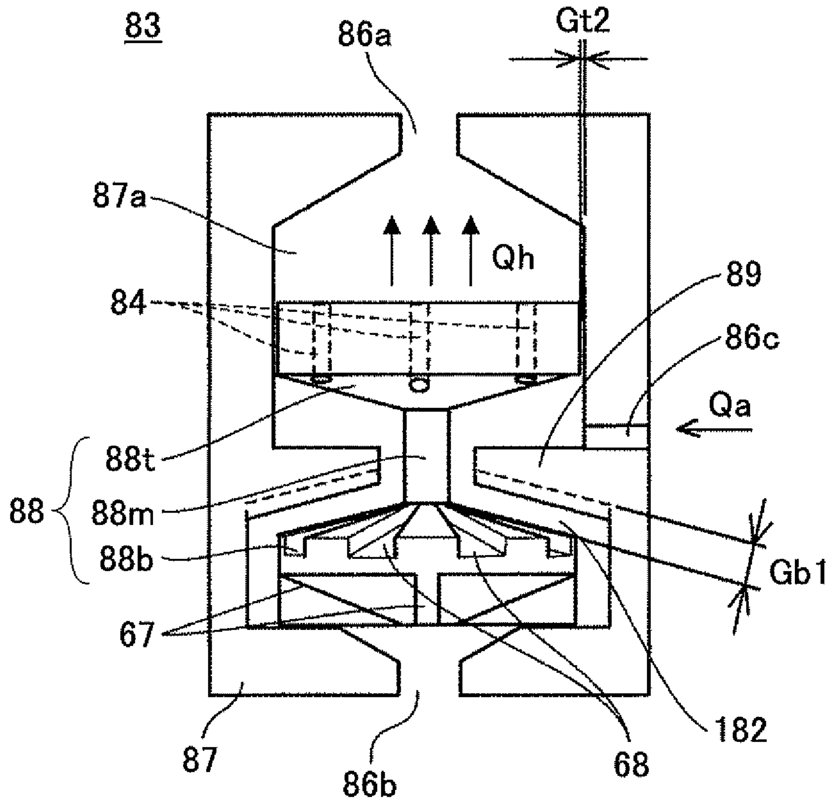
FIG. 21 is a schematic cross-sectional view illustrating an example of the flow path resistance varying unit used in the ink supply system according to the third embodiment of the present invention.
Figures 22A, 22B:
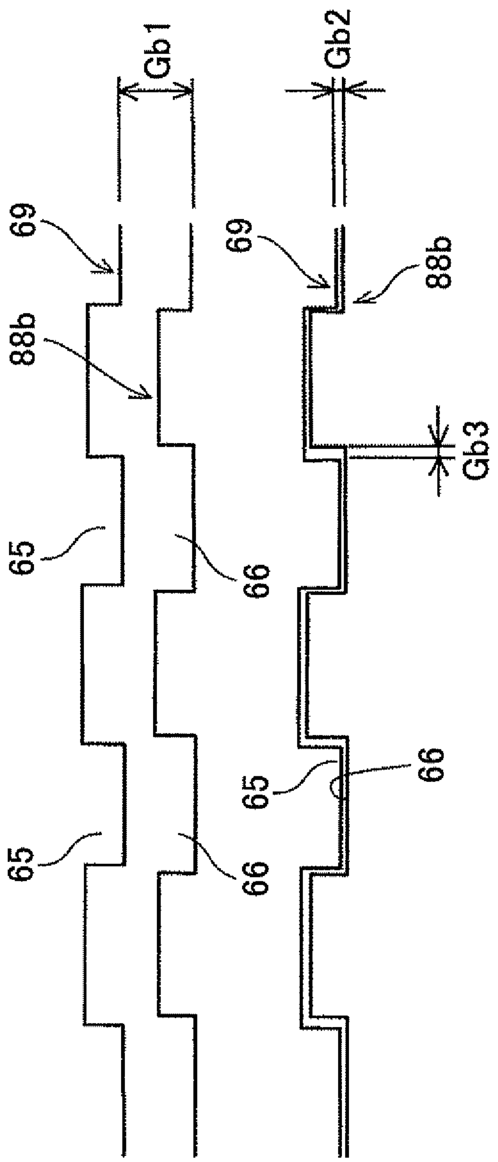
FIGS. 22A and 22B are schematic development views illustrating a part of the flow path resistance varying unit used in the ink supply system according to the third embodiment of the present invention.

Next, an ink supply system according to a third embodiment of the present invention is described with reference to FIGS. 19 through 22. FIG. 19 schematically illustrates a configuration of the ink supply system according to the third embodiment of the present invention. FIGS. 20A and 20B are cross-sectional views cut along a line K-K in FIG. 19. FIG. 21 is a schematic cross-sectional view illustrating an example of a flow path resistance varying unit used in the ink supply system. FIGS. 22A and 22B are schematic development views illustrating a part of the flow path resistance varying unit used in the ink supply system.

First, the ink cartridge (main tank) 76 includes the bag member 93 made of a flexible material that can be flexibly deformed as ink therein is consumed (e.g., the shape is changed from the state of FIG. 20A to the state of FIG. 20B). In the bag member 93 of the ink cartridge (main tank) 76, liquid (ink) is contained. Further, a compression spring 96 is disposed in the bag member 93.

By having this configuration, the ink cartridge (main tank) 76 may spontaneously generate negative pressure. Therefore, for example, as illustrated in FIG. 19, the ink cartridge (main tank) 76 may also be disposed higher than the nozzle surface of the recording head 10.

As illustrated in FIG. 21, similar to the above second embodiment of the present invention, in this third embodiment, there are through holes 84 extending in the direction parallel to the axis (longitudinal) direction of the valve body 88 and formed between the upper surface and the lower surface of the valve body top part 88*t*. The through holes 84 serve as the first throttling part. Due to the ink flow in the Qh direction, the valve body 88 is pulled up to the side of the port 86*a* (the valve body 88 is moved up and down in the internal flow path 87*a* in the tube member 87).

Further, plural grooves 66 are formed on the upper surface (side) of the valve body bottom part 88*b* facing the separation wall 89 in a manner such that the grooves 66 extend radially from the center axis of the valve body 88. Further, a concave-convex structure is formed on the lower surface (side) of the separation wall 89 facing the valve body bottom part 88*b* in a manner such that the convex parts 65 faces the corresponding grooves 66 as illustrated in FIG. 22A. By having this configuration, when the valve body 88 moves upward, the upper surface of the valve body bottom part 88*b* is engaged with the lower surface of the separation wall 89 with gaps therebetween.

By having the concave-convex structures on the upper surface of the valve body bottom part 88*b* and the lower surface of the separation wall 89 so that the valve body bottom part 88*b* is engaged with the separation wall 89 with gaps therebetween as illustrated in FIG. 22B, the gap "Gb3" is formed between the side surfaces of the respective convex parts and concave parts in addition to the gap "Gb2" similar to the gap "Gb2" in the second embodiment. Because of the additional gap "Gb3", in a case where the valve body 88 moves upward, before the assist pressure is suddenly generated due to narrowed gap "Gb2", the assist pressure may be gently generated due to the gap "Gb3". Therefore, it may become possible to improve the pressure stability.

Further, the second throttling part 182 having the gap "Gb1" between the valve body bottom part 88*b* and the separation wall 89 is formed (inclined) in a manner such that the side of the first flow path 71 (center side of the valve body bottom part 88*b*) is above (higher than) the side of the second flow path 60 (outer periphery side of the valve body bottom part 88*b*) in the vertical direction. By having this inclined structure of the second throttling part 182, even when an air bubble is fed from the side of the ink cartridge (main tank) 76 into the flow path resistance varying unit 83 (pressure adjusting valve) via the port 86*b*, the air bubble may be easily removed from the flow path resistance varying unit 83 (pressure adjusting valve) because the air bubble automatically moves upward due to its buoyancy force. As a result, it may become possible to easily prevent the air bubble from remaining in the flow path resistance varying unit 83 (pressure adjusting valve).

Further, in this embodiment, as illustrated in FIG. 19, a buffer member 97 is disposed between the liquid (ink) supply tube (first flow path) 71 and the pump (assist pump) 78. The buffer member 97 is a container having at least one wall surface made of flexible material such as a film and rubber, or a container including a certain gas layer. By having the buffer member 97, unnecessary pressure fluctuation amplitude due to the operation of the pump (assist pump) 78 may be reduced, and a transit pressure fluctuation when the pump is started and stopped may also be reduced. As a result, the pressure at the recording head 10 may be more stabilized.

Next, a flow path resistance varying unit 83 used in an ink supply system according to a fourth embodiment of the present invention is described with reference to FIGS. 23 through 24. FIGS. 23A and 23B are schematic cross-sectional views of the flow path resistance varying unit. FIG. 24 is a schematic development view illustrating a main part of another example of the flow path resistance varying unit.

In this flow path resistance varying unit 83, the valve body 88 is a rotating body and plural concentric grooves 66 are formed on the upper surface of the valve body bottom part 88*b*, the upper surface facing the lower surface of the separation wall 89. A concave-convex structure is formed on the lower surface of the separation wall 89, the lower surface facing the upper surface of the valve body bottom part 88*b*. Further, the convex parts 65 of the concave-convex structure are disposed so as to face respective grooves 66, so that, when the valve body 88 moves upward, the convex parts 65 and the respective grooves 66 are engaged with each other as illustrated in FIG. 23B.

Figure 23B:
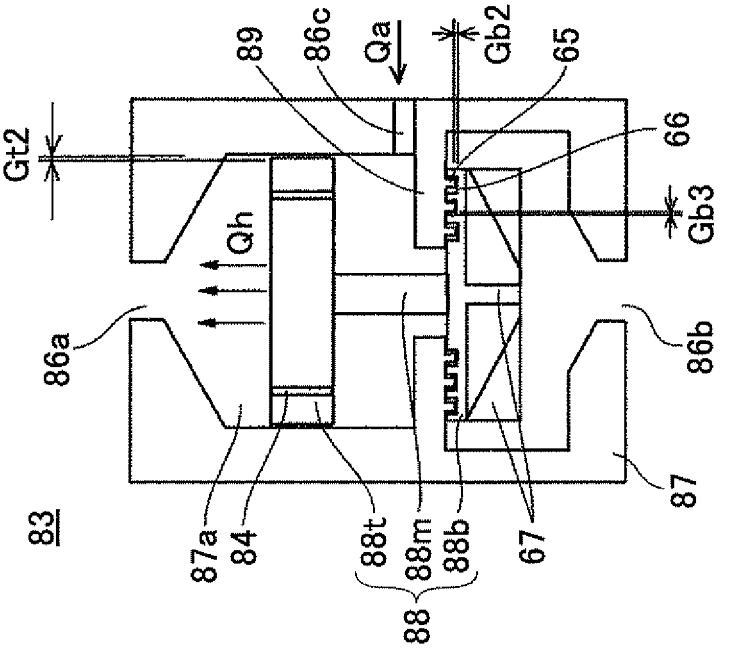
FIGS. 23A and 23B are schematic cross-sectional views illustrating an example of the flow path resistance varying unit used in the ink supply system according to a fourth embodiment of the present invention.
Figure 24:
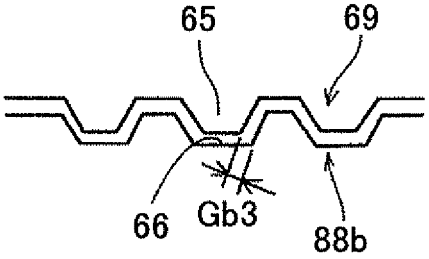
FIG. 24 is a schematic development view illustrating a part of the flow path resistance varying unit used in the ink supply system according to the fourth embodiment of the present invention.

By having the concave-convex structures on the upper surface of the valve body bottom part 88*b* and the lower surface of the separation wall 89 so that the valve body bottom part 88*b* is engaged with the separation wall 89 with gaps therebetween as illustrated in FIG. 23B, the gap "Gb3" is formed between the side surfaces of the respective convex parts and concave parts in addition to the gap "Gb2" similar to the third embodiment. Because of the additional gap "Gb3", in a case where the valve body 88 moves upward, before the assist pressure is suddenly generated due to narrowed gap "Gb2", the assist pressure may be gently generated due to the gap "Gb3". Therefore, it may become possible to improve the pressure stability.

Further, by having the concentrically formed concave-convex structure, when the valve body bottom part 88*b* and the separation wall 89 are engaged with each other as illustrated in FIG. 23B, practical flow path length between the port 86*b* and transverse hole (port) 86*c* is increased. Due to the increase of the practical flow path length, the fluid resistance in the second throttling part 182 (engaged part) is accordingly increased. Therefore, the assist pressure is also accordingly increased. As a result, it may become possible to generate relatively large difference of the assist pressure with relatively small movement of the valve body 88, thereby improving the responsiveness of the assist pressure.

Figure 23A:
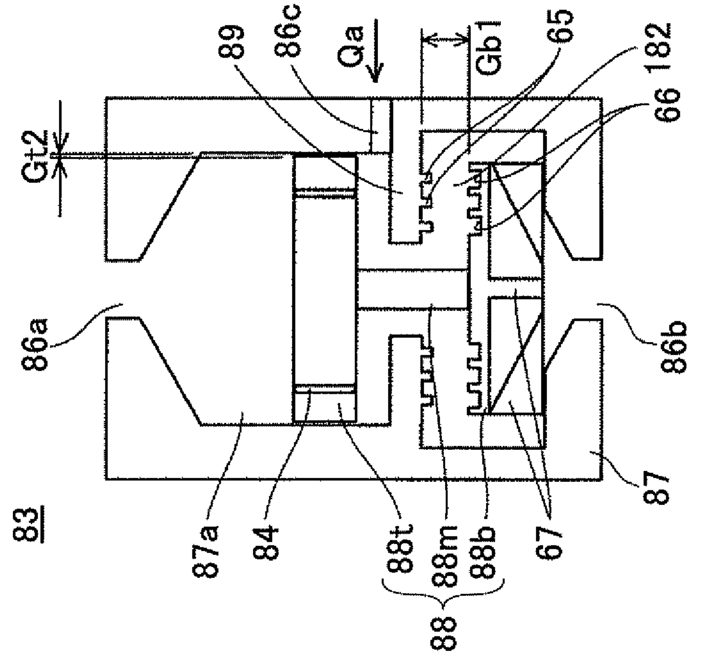

Further, because of the concentric concave-convex structures, by making the gap "Gt2" in FIGS. 23A and 23B sufficiently small, even when the valve body 88 rotates, the convex parts 65 of the separation wall 89 and the respective grooves 66 of the valve body bottom part 88*b* may be easily engaged with each other.

In this case, when the convex parts 65 of the separation wall 89 and the respective grooves 66 of the valve body bottom part 88*b* have the tapered surfaces as illustrated in FIG. 24, the convex parts 65 and the respective grooves 66 may be more easily engaged with each other.

Further, in the above descriptions, the operations and effects of the present invention are described based on an example where different color ink are supplied to the respective recording heads. However, the present invention is not limited to this configuration. For example, the present invention may also be applied to cases where the same color ink is supplied to plural recording heads and where differently processed inks (not different color inks) are supplied to the respective recording heads. Further, the present invention may also be applied to a liquid (ink) supply system having a recording head(s) including plural nozzle rows so that different types of fluid are discharged from a single recording head. Further, the present invention is not limited to an image forming apparatus discharging narrowly-defined ink. The present invention may also be applied to a liquid discharging apparatus (described as the "image forming apparatus" in this description of the present invention) discharging various liquids.

According to an embodiment of the present invention, an image forming apparatus includes a recording head having a nozzle for discharging droplets of liquid, a first fluid flow path supplying the liquid to the recording head, a liquid tank storing the liquid, a second fluid flow path being in fluid communication with the liquid tank, a pressure adjusting valve allowing the first fluid flow path and the second fluid flow path to be in fluid communication with each other, and a third fluid flow path having a liquid feeding unit, the third fluid flow path allowing either the second fluid flow path or the liquid tank and the pressure adjusting valve to be in fluid communication with each other. Further, the pressure adjusting valve includes a tube member defining an internal fluid flow path of the pressure adjusting valve, a movable member movably disposed in the internal fluid flow path, a first throttling part disposed on a side of the first fluid flow path, and a second throttling part disposed on a side of the second fluid flow path. Further, the second throttling part is formed as a gap between an internal wall of the tube member and the movable member; a length of the gap varies in response to a flow rate of the liquid flowing in the first fluid flow path; an internal fluid resistance of the pressure adjusting valve varies in response to the flow rate of the liquid flowing in the first fluid flow path; the third fluid flow path is in fluid communication with the internal fluid flow path through a part of the pressure adjusting valve, the part being disposed between the first throttling part and the second throttling part; and, when the liquid is discharged from the nozzle, the liquid is fed from the liquid tank to the recording head by the liquid feeding unit in a state where the recording head is in fluid communication with the liquid tank via the pressure adjusting valve.

Further, an anti-blocking unit may be provided on at least one of the internal wall of the tube member and the movable member of the pressure adjusting valve and preventing the internal fluid flow path from being blocked.

The anti-blocking unit may be one or more protrusions or grooves.

Further, the movable member may include a first pressure generation part forming the first throttling part, a second pressure generation part forming the second throttling part, and an intermediate part allowing the first pressure generation part and the second pressure generation part to be connected with each other via the intermediate part. Further the one or more protrusions may be formed on the intermediate part.

Further, at least one of the first pressure generation part, the second pressure generation part, and the intermediate part may have a sliding part sliding above the internal wall of the tube member.

Further, the movable member may have a through hole so that the first fluid flow path and the third fluid flow path are in fluid communication with each other.

Further, the through hole includes plural through holes, and the plural through holes may be symmetrically disposed with respect to the circumferential direction on a surface of the valve body, the surface facing the side of the first fluid flow path.

Further, in a part of the gap forming the second throttling part, a rib may be formed on one of the internal wall of the tube member and the movable member and a concave part may be formed on the other one of the internal wall of the tube member and the movable member so that the rib is engaged with the concave part.

Further, the movable member may be rotatably disposed in the internal fluid flow path, and the rib and the concave part may be concentrically formed.

Further, in a part of the gap forming the second throttling part, the side of the first fluid flow path may be higher than the side of the second fluid flow path in the vertical direction.

Further, the image forming apparatus may include plural liquid feeding units corresponding to liquid of different colors. Further the recording head may discharge different color droplets or include plural nozzle rows discharging liquid droplets of different colors, and the plural liquid feeding units may be driven by a common actuator.

In an image forming apparatus according to an embodiment of the present invention, when liquid droplets are discharged from the nozzle of the recording head, the liquid is fed from the liquid tank to the recording head by the liquid feeding unit in a state where the recording head is in fluid communication with the liquid tank via the pressure adjusting valve. In this case, the internal fluid resistance of the pressure adjusting valve varies in response to the flow rate of the liquid. By having this configuration, an assist pressure in response to the discharge flow rate from the recording head can be automatically and adequately determined and the determined assist pressure is applied to the recording head. Therefore, it may become possible to prevent the ink supply shortage due to the use of a longer tube member, increase of discharge flow rate, increase the viscosity of liquid to be discharged and the like, and also reduce the discharge failure. Further, in the pressure adjusting valve, the internal fluid resistance is generated in a gap between the tube member and the movable member and the gap (length of gap) varies in response to the discharge flow rate from the recording head. By having this configuration, the pressure control (adjustment) having good responsiveness may be performed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a recording head having a nozzle for discharging droplets of liquid;

a first fluid flow path supplying the liquid to the recording head;

a liquid tank storing the liquid;

a second fluid flow path being in fluid communication with the liquid tank;

a pressure adjusting valve allowing the first fluid flow path and the second fluid flow path to be in fluid communication with each other; and a third fluid flow path having a liquid feeding unit, the third fluid flow path allowing either the second fluid flow path or the liquid tank and the pressure adjusting valve to be in fluid communication with each other, wherein the pressure adjusting valve comprises:

a tube member defining an internal fluid flow path of the pressure adjusting valve;

a movable member movably disposed in the internal fluid flow path;

a first throttling part disposed on a side of the first fluid flow path; and a second throttling part disposed on a side of the second fluid flow path, wherein the second throttling part is formed as a gap between an internal wall of the tube member and the movable member, a length of the gap varies in response to a flow rate of the liquid flowing in the first fluid flow path, an internal fluid resistance of the pressure adjusting valve varies in response to the flow rate of the liquid flowing in the first fluid flow path, the third fluid flow path is in fluid communication with the internal fluid flow path through a part of the pressure adjusting valve, the part being disposed between the first throttling part and the second throttling part, and when the liquid is discharged from the nozzle, the liquid is fed from the liquid tank to the recording head by the liquid feeding unit in a state where the recording head is in fluid communication with the liquid tank via the pressure adjusting valve.

2. An image forming apparatus according to claim 1, further comprising:

an anti-blocking unit being provided on at least one of the internal wall of the tube member and the movable member of the pressure adjusting valve and preventing the internal fluid flow path from being blocked.

3. An image forming apparatus according to claim 2, wherein the anti-blocking unit is one or more protrusions or grooves.

4. An image forming apparatus according to claim 3, wherein the movable member comprises:

a first pressure generation part forming the first throttling part;

a second pressure generation part forming the second throttling part; and an intermediate part allowing the first pressure generation part and the second pressure generation part to be connected with each other via the intermediate part, wherein the one or more protrusions are formed on the intermediate part.

5. An image forming apparatus according to claim 1, wherein the movable member comprises:

a first pressure generation part forming the first throttling part;

a second pressure generation part forming the second throttling part; and an intermediate part allowing the first pressure generation part and the second pressure generation part to be connected with each other via the intermediate part, wherein at least one of the first pressure generation part, the second pressure generation part, and the intermediate part has a sliding part sliding above the internal wall of the tube member.

6. An image forming apparatus according to claim 1, wherein the movable member has a through hole so that the first fluid flow path and the third fluid flow path are in fluid communication with each other.

7. An image forming apparatus according to claim 6, wherein the through hole includes plural through holes, and the plural through holes are symmetrically disposed with respect to the circumferential direction on a surface of the valve body, the surface facing the side of the first fluid flow path.

8. An image forming apparatus according to claim 1, wherein in a part of the gap forming the second throttling part, a rib is formed on one of the internal wall of the tube member and the movable member and a concave part is formed on the other one of the internal wall of the tube member and the movable member so that the rib is engaged with the concave part.

9. An image forming apparatus according to claim 8, wherein the movable member is rotatably disposed in the internal fluid flow path, and the rib and the concave part are concentrically formed.

10. An image forming apparatus according to claim 1, wherein in a part of the gap forming the second throttling part, the side of the first fluid flow path is higher than the side of the second fluid flow path in the vertical direction.

11. An image forming apparatus according to claim 1, further comprising:

plural liquid feeding units corresponding to liquid of different colors, wherein the recording head discharges different color droplets or includes plural nozzle rows discharging liquid droplets of different colors, and the plural liquid feeding units are driven by a common actuator.

* * * * *